US008356747B2

(12) United States Patent
Sudo et al.

(10) Patent No.: US 8,356,747 B2
(45) Date of Patent: Jan. 22, 2013

(54) BANKNOTE DEPOSIT TRANSACTION APPARATUS AND BANKNOTE DEPOSIT TRANSACTION METHOD

(75) Inventors: Teruo Sudo, Hyogo (JP); Kozen Nakai, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 24 days.

(21) Appl. No.: 13/133,735

(22) PCT Filed: Dec. 9, 2008

(86) PCT No.: PCT/JP2008/072333

§ 371 (c)(1),
(2), (4) Date: Jun. 9, 2011

(87) PCT Pub. No.: WO2010/067421

PCT Pub. Date: Jun. 17, 2010

(65) Prior Publication Data

US 2011/0240734 A1 Oct. 6, 2011

(51) Int. Cl.
*G06Q 40/00* (2012.01)
*G07D 11/00* (2006.01)
*G07F 19/00* (2006.01)
*G07F 7/04* (2006.01)
*B07C 5/00* (2006.01)

(52) U.S. Cl. ......... 235/379; 209/534; 209/551; 194/206

(58) Field of Classification Search .................. 235/379; 209/534, 551; 194/206; 377/8, 39; 53/399, 53/447, 531, 540, 541
See application file for complete search history.

(56) References Cited

U.S. PATENT DOCUMENTS 4,587,408 A 5/1986 Watanabe (Continued)

FOREIGN PATENT DOCUMENTS

DE 3325 181 C2 2/1988

(Continued)

OTHER PUBLICATIONS

European Search Report (Application No. 08878720.5—PCT/JP2008072333) (6 pages—dated Mar. 4, 2012).

*Primary Examiner* — Michael G Lee
*Assistant Examiner* — Suezu Ellis
(74) *Attorney, Agent, or Firm* — Renner, Kenner, Greive, Bobak, Taylor & Weber

(57) ABSTRACT

A banknote deposit transaction apparatus (1) confirms number of deposited banknotes on a per transaction basis. The apparatus includes a bundling-object-banknote stacking unit (21) that sorts and stacks bundling-object-banknotes among transported banknotes; a bundling-object-banknote counting unit (41A) that counts number of bundling-object-banknotes stacked in the bundling-object-banknote stacking unit (21) as number of unconfirmed deposited banknotes; a banknote bundling unit (22) that, when the number of stacked bundling-object-banknotes reaches a predetermined number, bundles the bundling-object-banknotes; a tentative confirming unit (101) that performs a tentative confirmation of the number of unconfirmed deposited banknotes in a current transaction among bundled banknotes at a timing of bundling; and a confirming unit that, upon detecting an operation for ending a transaction, confirms the number of tentatively confirmed and unconfirmed banknotes as a total number of banknotes deposited in the current transaction, and performs recording and management of number of banknotes stacked in the bundling-object-banknote stacking unit (21) as number of loose banknotes of a previous transaction. This reduces the opportunities of unbundling the bundled banknotes in an operation for fault recovery thereby greatly reducing a work burden of an operator.

15 Claims, 8 Drawing Sheets

U.S. PATENT DOCUMENTS

| | | | | |
|---|---|---|---|---|
| 4,694,963 | A * | 9/1987 | Takesako | 209/534 |
| 4,825,378 | A * | 4/1989 | Yuge | 700/223 |
| 5,468,941 | A * | 11/1995 | Sasaki | 235/379 |
| 5,522,511 | A * | 6/1996 | Sakoguchi et al. | 209/534 |
| 6,502,052 | B1 | 12/2002 | Someya et al. | |
| 6,771,180 | B2 * | 8/2004 | Mizuta et al. | 340/674 |
| 6,892,872 | B2 * | 5/2005 | Miyashita | 194/302 |
| 7,232,024 | B2 * | 6/2007 | Mazur et al. | 194/207 |
| 7,600,626 | B2 * | 10/2009 | Hallowell et al. | 194/206 |
| 7,628,279 | B2 * | 12/2009 | Sekiguchi et al. | 209/534 |
| 7,980,394 | B2 * | 7/2011 | Otsuka | 209/534 |
| 8,056,305 | B1 * | 11/2011 | Folk et al. | 53/399 |
| 8,074,806 | B2 * | 12/2011 | Ozaki et al. | 209/534 |
| 8,220,638 | B2 * | 7/2012 | Kuroda et al. | 209/534 |
| 2004/0083149 | A1 * | 4/2004 | Jones | 705/35 |
| 2008/0060906 | A1 * | 3/2008 | Fitzgerald et al. | 194/207 |
| 2009/0057093 | A1 * | 3/2009 | Iwami et al. | 194/206 |
| 2009/0184034 | A1 * | 7/2009 | Doi et al. | 209/534 |
| 2009/0229949 | A1 * | 9/2009 | Nakamoto | 194/302 |
| 2010/0326789 | A1 * | 12/2010 | Yokota | 194/206 |
| 2011/0048891 | A1 * | 3/2011 | Iwami | 194/206 |
| 2011/0072987 | A1 * | 3/2011 | Nobuhara et al. | 100/7 |
| 2011/0077770 | A1 * | 3/2011 | Ito | 700/218 |
| 2011/0125313 | A1 * | 5/2011 | Hodatsu et al. | 700/223 |
| 2011/0296802 | A1 * | 12/2011 | Yano et al. | 53/531 |
| 2011/0314773 | A1 * | 12/2011 | Suzuki et al. | 53/399 |
| 2012/0011813 | A1 * | 1/2012 | Nakai et al. | 53/447 |

FOREIGN PATENT DOCUMENTS

| | | | |
|---|---|---|---|
| EP | 1 926 057 | A1 | 5/2008 |
| EP | 1 975 887 | A2 | 10/2008 |
| JP | 61-296494 | | 12/1986 |
| JP | 9-153168 | | 6/1997 |
| JP | 3922425 | | 5/2007 |

* cited by examiner

BANKNOTE DEPOSIT TRANSACTION APPARATUS AND BANKNOTE DEPOSIT TRANSACTION METHOD

TECHNICAL FIELD

The present invention relates to a banknote deposit transaction apparatus and a banknote deposit transaction method that sort and stack banknotes, by denomination, in continuous deposit transactions, and count the number of sorted and stacked banknotes of each denomination on a per transaction basis.

BACKGROUND ART

Banknote deposit transaction apparatuses that sort and stack banknotes, by denomination, in continuous deposit transactions, and count the number of deposited banknotes of each denomination on a per transaction basis are known in the art.

Such a conventional banknote deposit transaction apparatus includes a denomination recognizing unit that recognizes the denomination of the banknote, stackers in which the banknotes are sorted and stacked by denomination, a counting unit that counts number of banknotes of each denomination, and a fault-recovery processing unit that separately manages the number of unconfirmed banknotes, which are deposited in the current transaction, and the number of confirmed banknotes, which have been stacked in the stackers in one or more of the transactions prior to the current transaction (for example, see Patent Document 1).

In the technology described in Patent Document 1, even if a fault such as banknote jamming occurs, after clearing of the fault, the unconfirmed banknotes in the current transaction and the confirmed banknotes from the previous transaction present inside the apparatus are collected, and redeposited in a hopper unit. Thereafter, the total number of collected banknotes from both the current transaction and the previous transaction are sequentially sorted and stacked again in the stackers provided corresponding to the denominations. Consequently, even if a fault occurs, a banknote stacking status is restored to a status that was prior to the occurrence of the fault.

Yet another conventional banknote deposit transaction apparatus includes a counting unit that counts the deposited banknotes, a strapping unit that ties a strap around a predetermined number of the banknotes counted by the counting unit to form small bundles of the banknotes, a stacking unit that stacks loose banknotes that have not been strapped, a memory unit that stores therein the number of loose banknotes, and a subtracting unit that, when it is detected that the loose banknotes have been removed from the stacking unit, and the loose banknotes and the banknotes in the current transaction are collected and stacked in the stacking unit, subtracts the number of the loose banknotes stored in the storage memory unit from the total number of the collected banknotes. Thus, even if the loose banknotes are removed, the number of loose banknotes stored previously is automatically subtracted from a sum of the number of loose banknotes and the number of banknotes in the current transaction. Consequently, the burden on an operator is reduced because there is no need for divide all the banknotes into the number of loose banknotes from the previous transaction and the number of loose banknotes from the current transaction (see Patent Document 2).

[Patent Document 1] Japanese Patent No. 3922425

[Patent Document 2] Japanese Patent Application Laid-open No. H9-153168

DISCLOSURE OF INVENTION

Problem to be Solved by the Invention

Assuming that a banknote bundling function for bundling (strapping) a predetermined number of banknotes of specific denominations is provided in the conventional banknote deposit transaction apparatus, after a clearing of a fault which occurred during the current transaction, the banknotes, present inside the apparatus, in the previous transaction and the current transaction are collected, and the collected banknotes are redeposited in the hopper unit. Thereafter, the sorting and stacking of the collected banknotes are performed again. However, during the current transaction, if already a plurality of bundles of banknotes has been formed, all the bundles in the transaction will have to be unbundled for collecting the banknotes in the current transaction. Therefore, in the fault recovery process, the operator has a heavy work burden when performing the operation of placing the collected banknotes back in the hopper unit.

In the conventional banknote deposit transaction apparatus, in addition to the bundles formed from the banknotes deposited in the current transaction, it is possible that some bundles have been formed from banknotes that have been deposited over a plurality of transactions.

In the conventional banknote deposit transaction apparatus, after a clearing of a fault which occurred during the current transaction, the banknotes present inside the apparatus in the previous transaction and the current transaction are collected, and the collected banknotes are redeposited in the hopper unit. Thereafter, the sorting and stacking of the collected banknotes are performed again. However, when a bundle is formed from banknotes deposited over a plurality of transactions, it will become a cumbersome task to separate the bundled banknotes into each transaction because banknotes of a plurality of transactions are mixed in the bundle.

The present invention has been made in view of the above discussion. An object of the present invention is to provide a banknote deposit transaction apparatus and a banknote deposit transaction method that reduce the incidence of unbundling the bundled banknotes in the fault recovery process even if a banknote bundling function is added, thus largely reducing the work burden of the operator, and enables an easy process to separate the bundled banknotes into each transaction.

Means for Solving Problem

To achieve the above objects, a banknote deposit transaction apparatus according to claim 1 of the present application confirms number of deposited banknotes in continuous deposit transactions on a per transaction basis and includes an inlet port for depositing a banknote; a transporting unit that feeds and transports, one by one, the banknote deposited into the inlet port; a bundling-object-banknote stacking unit that sequentially sorts and stacks banknotes of a specific denomination that are bundling-object-banknotes among the banknotes that are sequentially transported by the transporting unit; a bundling-object-banknote counting unit that counts number of bundling-object-banknotes that are sorted and stacked in the bundling-object-banknote stacking unit as number of unconfirmed deposited banknotes; a banknote bundling unit that, when the number of bundling-object-banknotes that are sorted and stacked in the bundling-object-banknote stacking unit reaches a predetermined number, bundles the predetermined number of bundling-object-banknotes; a tentative confirming unit that performs a tentative confirmation of the number of unconfirmed deposited banknotes in a current transaction among the banknotes that are to be bundled, at a timing of bundling of the predetermined number of bundling-object-banknotes; and a confirming unit that, upon detecting an operation for ending a transaction, confirms a total of the number of tentatively confirmed deposited banknotes and the number of unconfirmed deposited banknotes in the current transaction as a total number of banknotes deposited in the current transaction, and performs recording and management of number of stacked banknotes that are stacked in the bundling-object-banknote stacking unit as number of loose banknotes of a previous transaction.

The banknote deposit transaction apparatus according to claim 2 of the present application, in the structure according to claim 1, further includes a tentative-confirmation judging unit that, upon detecting an operation for fault recovery during the current transaction, judges whether the tentative confirmation has been made during the current transaction; and a control unit that, when the tentative confirmation has been made during the current transaction, clears the number of unconfirmed deposited banknotes in the current transaction, and after redepositing into the inlet port all the banknotes present inside the apparatus, other than bundled banknotes, controls the transporting unit to retransport the banknotes that are redeposited into the inlet port.

In the banknote deposit transaction apparatus according to claim 3 of the present application, in the structure according to claim 2, the control unit, when the tentative confirmation was not made during the current transaction by the tentative-confirmation judging unit, clears the number of unconfirmed deposited banknotes in the current transaction, and after redepositing into the inlet port all the banknotes present inside the apparatus, controls the transporting unit to retransport the banknotes that are redeposited into the inlet port so that number of banknotes stacked in the bundling-object-banknote stacking unit is equivalent to the number that is being recorded and managed by the confirming unit as the number of loose banknotes from a transaction immediately before the current transaction.

The banknote deposit transaction apparatus according to claim 4 of the present application, in the structure according to claim 1, further includes a control unit that, upon detecting an operation for cancelling the current transaction, clears the number of tentatively confirmed deposited banknotes and the number of unconfirmed deposited banknotes in the current transaction, and after redepositing into the inlet port banknotes in the current transaction including bundled banknotes and/or banknotes equivalent to the number of unconfirmed deposited banknotes, controls the transporting unit to retransport the banknotes that are redeposited into the inlet port so that number of banknotes stacked in the bundling-object-banknote stacking unit is equivalent to the number that is being recorded and managed by the confirming unit as the number of loose banknotes from a transaction immediately before the current transaction while rejecting the tentatively confirmed banknotes and the unconfirmed banknotes in the current transaction from the apparatus.

The banknote deposit transaction apparatus according to claim 5 of the present application, in the structure according to claim 4, further includes a display unit that, upon detecting the operation for cancelling the current transaction, displays number of bundles of all the banknotes that have been bundled during the current transaction as guidance information.

In the banknote deposit transaction apparatus according to claim 6 of the present application, in the structure according to claim 1, the timing of bundling represents a timing at which the predetermined number of banknotes are bundled by the banknote bundling unit.

In the banknote deposit transaction apparatus according to claim 7 of the present application, in the structure according to claim 1, the timing of bundling represents a timing at which the number of bundling-object-banknotes that are sorted and stacked in the bundling-object-banknote stacking unit reaches the predetermined number.

In the banknote deposit transaction apparatus according to claim 8 of the present application, in the structure according to claim 1, the confirming unit, upon detecting the operation for ending the transaction, based on a predetermined setting, stimulates removal of the banknotes that are stacked in the bundling-object-banknote stacking unit, and performs recording and management of the number of loose banknotes of the previous transaction as zero.

The banknote deposit transaction apparatus according to claim 9 of the present application, in the structure according to claim 1, further includes a sorted-banknote stacking unit that sorts and stacks banknotes other than the banknotes of the specific denomination that are transported by the transporting unit based on a denomination of the banknote; and a sorted-banknote counting unit that counts the banknotes that are sorted and stacked in the sorted-banknote stacking unit as unconfirmed banknotes per denomination, wherein the tentative confirming unit, upon detecting removal of a predetermined number of banknotes that are sorted and stacked in the sorted-banknote stacking unit, performs a tentative confirmation of the number of unconfirmed deposited banknotes in the current transaction in the sorted-banknote stacking unit at a removal timing of the banknotes, and the confirming unit, upon detecting the operation for ending the transaction, confirms a total of the number of tentatively confirmed deposited banknotes and the number of unconfirmed deposited banknotes, that are in the bundling-object-banknote stacking unit, in the current transaction as a total number of banknotes deposited in the current transaction of the bundling-object-banknote stacking unit, and confirms a total of the number of tentatively confirmed deposited banknotes and unconfirmed deposited banknotes, that are in the sorted-banknote stacking unit, in the current transaction as a total number of banknotes deposited in the current transaction of the sorted-banknote counting unit, performs recording and management of number of stacked banknotes that are stacked in the bundling-object-banknote stacking unit as number of loose banknotes of the previous transaction of the bundling-object-banknote stacking unit, and performs recording and management of number of stacked banknotes that are stacked in the sorted-banknote stacking unit as number of loose banknotes of the previous transaction of the sorted-banknote stacking unit.

The banknote deposit transaction apparatus according to claim 10 of the present application, in the structure according to claim 9, further includes a tentative-confirmation judging unit that, upon detecting an operation for fault recovery during the current transaction, judges whether the tentative confirmation has been made during the current transaction; and a control unit that, when the tentative confirmation has been made during the current transaction, clears the number of unconfirmed deposited banknotes in the bundling-object-banknote stacking unit and the sorted-banknote stacking unit in the current transaction, after redepositing into the inlet port all the banknotes present inside the apparatus other than bundled banknotes and removed banknotes that are removed from the sorted-banknote stacking unit, controls the transporting unit to retransport the banknotes that are redeposited into the inlet port.

In the banknote deposit transaction apparatus according to claim 11 of the present application, in the structure according to claim 10, the control unit, when the tentative confirmation was not made during the current transaction by the tentative-confirmation judging unit, clears the number of unconfirmed deposited banknotes in the bundling-object-banknote stacking unit and the sorted-banknote stacking unit in the current transaction, and after redepositing into the inlet port all the banknotes present inside the apparatus, controls the transporting unit to retransport the banknotes that are redeposited into the inlet port so that number of banknotes stacked in the bundling-object-banknote stacking unit is equivalent to the number that is being recorded and managed by the confirming unit as the number of loose banknotes of the bundling-object-banknote stacking unit from a transaction immediately before the current transaction, and number of banknotes stacked in the sorted-banknote stacking unit is equivalent to the number that is being recorded and managed by the confirming unit as the number of loose banknotes of the sorted-banknote stacking unit from the transaction immediately before the current transaction.

The banknote deposit transaction apparatus according to claim 12 of the present application, in the structure according to claim 9, further includes a control unit that, upon detecting an operation for cancelling the current transaction, clears the number of tentatively confirmed deposited banknotes in the bundling-object-banknote stacking unit and the sorted-banknote stacking unit in the current transaction, after redepositing into the inlet port banknotes, in addition to all the banknotes that are stacked in the sorted-banknote stacking unit, all the bundled banknotes including the banknotes in the current transaction in the apparatus, the banknotes that have been removed from the sorted-banknote stacking unit, and/or banknotes equivalent to the number of unconfirmed deposited banknotes, while rejecting the tentatively confirmed and unconfirmed banknotes in the bundling-object-banknote stacking unit and the sorted-banknote stacking unit in the current transaction, controls the transporting unit to retransport the banknotes that are redeposited into the inlet port so that number of banknotes stacked in the bundling-object-banknote stacking unit is equivalent to the number that is being recorded and managed by the confirming unit as the number of loose banknotes of the bundling-object-banknote stacking unit from a transaction immediately before the current transaction, and number of banknotes stacked in the sorted-banknote stacking unit is equivalent to the number that is being recorded and managed by the confirming unit as the number of loose banknotes of the sorted-banknote stacking unit from the transaction immediately before the current transaction while rejecting the tentatively confirmed banknotes and the unconfirmed banknotes, that had been stacked in the bundling-object-banknote stacking unit or the sorted-banknote stacking unit in the current transaction, from the apparatus.

The banknote deposit transaction apparatus according to claim 13 of the present application, in the structure according to claim 12, further includes a display unit that, upon detecting the operation for cancelling the current transaction, displays number of bundles of all the banknotes that have been bundled including the banknotes in the current transaction as guidance information.

To achieve the above objects, a banknote deposit transaction method according to claim 14 of the present application confirms number of deposited banknotes in continuous deposit transactions on a per transaction basis and includes a depositing step of depositing a banknote; a transporting step including feeding and transporting, one by one, the banknote deposited at the depositing step; a bundling-object-banknote stacking step of sequentially sorting and stacking banknotes of a specific denomination that are bundling-object-banknotes among the banknotes that are sequentially transported at the transporting step; a bundling-object-banknote counting step of counting number of bundling-object-banknotes that are sorted and stacked at the bundling-object-banknote stacking step as number of unconfirmed deposited banknotes; a banknote bundling step of, when the number of bundling-object-banknotes that are sorted and stacked at the bundling-object-banknote stacking step reaches a predetermined number, bundling the predetermined number of bundling-object-banknotes; a tentative confirming step of performing a tentative confirmation of the number of unconfirmed deposited banknotes in a current transaction among the banknotes that are to be bundled at a timing of bundling of the predetermined number of bundling-object-banknotes; and a confirming step of, upon detecting an operation for ending a transaction, confirming a total of the number of tentatively confirmed deposited banknotes and the number of unconfirmed deposited banknotes in the current transaction as a total number of banknotes deposited in the current transaction, and performing recording and management of number of stacked banknotes that are stacked at the bundling-object-banknote stacking step as number of loose banknotes of a previous transaction.

The banknote deposit transaction method according to claim 15 of the present application, in the method according to claim 14, further includes a sorted-banknote stacking step of sorting and stacking banknotes other than the banknotes of the specific denomination that are transported at the transporting step based on a denomination of the banknote; and a sorted-banknote counting step of counting the banknotes that are sorted and stacked at the sorted-banknote stacking step as unconfirmed banknotes per denomination, wherein the tentative confirming step, upon detecting removal of a predetermined number of banknotes that are sorted and stacked at the sorted-banknote stacking step, includes performing a tentative confirmation of the number of unconfirmed deposited banknotes in the current transaction at the sorted-banknote stacking step at a removal timing of the banknotes, and the confirming step, upon detecting the operation for ending the transaction, includes confirming a total of the number of tentatively confirmed deposited banknotes in the current transaction at the bundling-object-banknote stacking step and the number of unconfirmed deposited banknotes as a total number of banknotes deposited in the current transaction of the bundling-object-banknote stacking step, and confirming a total of the number of tentatively confirmed deposited banknotes in the current transaction at the sorted-banknote counting step and the number of unconfirmed deposited banknotes as a total number of banknotes deposited in the current transaction at the sorted-banknote counting step, performing recording and management of number of stacked banknotes that are stacked at the bundling-object-banknote stacking step as number of loose banknotes of the previous transaction at the bundling-object-banknote stacking step, and performing recording and management of number of stacked banknotes that are stacked at the sorted-banknote stacking step as number of loose banknotes of the previous transaction at the sorted-banknote stacking step.

Advantages of the Invention

In the banknote deposit transaction apparatus according to claim 1 of the present application configured as above, the number of bundling-object-banknotes are counted as the number of unconfirmed deposited banknotes; and, at the timing of bundling of the predetermined number of bundling-object-banknotes, a tentative confirmation is performed of the number of unconfirmed deposited banknotes in the current transaction among the banknotes that are to be bundled. Therefore, even when a banknote bundling function for bundling the predetermined banknotes is added, an operability to separate transactions of the bundled banknotes can be improved, and, for example, even in an operation for fault recovery during the current transaction, an operation for redepositing all the banknotes in a current transaction and a previous transaction into the inlet port need not be performed, and even when bundled banknotes are present in the current transaction, it is sufficient to redeposit only the unconfirmed banknotes into the inlet port without unbundling the bundled banknotes. Consequently, a work burden of the operator can be greatly reduced.

In the banknote deposit transaction apparatus according to claim 1 of the present application, upon detecting an operation for ending a transaction, a total of the number of tentatively confirmed deposited banknotes and the number of unconfirmed deposited banknotes in the current transaction is confirmed as a total number of banknotes deposited in the current transaction, and recording and management is performed of number of stacked banknotes that are stacked in the bundling-object-banknote stacking unit as the number of loose banknotes of the previous transaction. Therefore, even when the banknote bundling function is added, in the operation for ending a transaction, it is needless to say that, in addition to making it possible to perform a separation of the number of deposited banknotes in the current transaction and the previous transaction, it is possible to confirm the number of deposited banknotes of all the deposited banknotes in the current transaction.

In the banknote deposit transaction apparatus according to claim 2 of the present application, the following advantage is achieved in addition to that achieved with the structure disclosed in claim 1 of the present application. Upon detecting an operation for fault recovery during the current transaction, and when a tentative confirmation has been made during the current transaction, the number of unconfirmed deposited banknotes in the current transaction is cleared, and after redepositing into the inlet port all the banknotes present inside the apparatus, other than bundled banknotes, the banknotes that are redeposited into the inlet port are retransported. Therefore, even when the bundled banknotes are present in the current transaction, a status of the apparatus can be restored to a banknote stacking status that was at the time of an immediate previous tentative confirmation made in the current transaction by redepositing all the banknotes inside the apparatus into the inlet port, except the bundled banknotes, without having to unbundle the bundled banknotes.

In the banknote deposit transaction apparatus according to claim 3 of the present application, the following advantage is achieved in addition to that achieved with the structure disclosed in claim 2 of the present application. Upon detecting the operation for fault recovery during the current transaction, and when the tentative confirmation was not made during the current transaction, the number of unconfirmed deposited banknotes in the current transaction are cleared, and after redepositing into the inlet port all the banknotes present inside the apparatus, while retaining in the bundling-object-banknote stacking unit banknotes that are being recorded and managed in the confirming unit as the number of loose banknotes from a transaction immediately before the current transaction, the banknotes that are redeposited into the inlet port are retransported. Therefore, when the bundled banknotes are not present in the current transaction, a status of the apparatus can be restored to a banknote stacking status that was at a time of tentative confirmation immediately before the current transaction by simply redepositing all the banknotes inside the apparatus into the inlet port.

In the banknote deposit transaction apparatus according to claim 4 of the present application, the following advantage is achieved in addition to that achieved with the structure disclosed in claim 1 of the present application. Upon detecting an operation for cancelling the current transaction, the number of tentatively confirmed deposited banknotes and the number of unconfirmed deposited banknotes in the current transaction are cleared, and after redepositing into the inlet port banknotes in the current transaction including bundled banknotes and/or banknotes equivalent to the number of unconfirmed deposited banknotes, while rejecting the tentatively confirmed and the unconfirmed banknotes in the current transaction from the apparatus and while retaining in the bundling-object-banknote stacking unit banknotes equivalent to the banknotes that are being recorded and managed in the confirming unit as number of loose banknotes from a transaction immediately before the current transaction, the banknotes that are deposited into the inlet port are retransported. Consequently, all the banknote deposit transactions going on in the current transaction can be cancelled.

In the banknote deposit transaction apparatus according to claim 5 of the present application, the following advantage is achieved in addition to that achieved with the structure disclosed in claim 4 of the present application. Upon detecting the operation for cancelling the current transaction, number of bundles of all the banknotes that have been bundled during the current transaction is displayed as the guidance information. Consequently, the operator can recognize the number of bundles of all the bundled banknotes in the current transaction by visually checking the guidance information.

In the banknote deposit transaction apparatus according to claim 6 of the present application, the following advantage is achieved in addition to that achieved with the structure disclosed in claim 1 of the present application. That is, at the timing of bundling of the predetermined number of banknotes by the banknote bundling unit, a tentative confirmation can be performed of the number of unconfirmed deposited banknotes in the current transaction among the banknotes that are to be bundled.

In the banknote deposit transaction apparatus according to claim 7 of the present application, the following advantage is achieved in addition to that achieved with the structure disclosed in claim 1 of the present application. That is, at the timing at which the number of bundling-object-banknotes that are sorted and stacked in the bundling-object-banknote stacking unit reaches the predetermined number, a tentative confirmation can be performed of the number of unconfirmed deposited banknotes in the current transaction among the banknotes that are to be bundled.

In the banknote deposit transaction apparatus according to claim 8 of the present application, the following advantage is achieved in addition to that achieved with the structure disclosed in claim 1 of the present application. The confirming unit, upon detecting the operation for ending the transaction, based on a predetermined setting, stimulates removal of the banknotes that are stacked in the bundling-object-banknote stacking unit, and performs recording and management of the number of loose banknotes of the previous transaction as zero. Consequently, the number of loose banknotes can be removed per transaction based on the predetermined setting.

In the banknote deposit transaction apparatus according to claim 9 of the present application, the following advantage is achieved in addition to that achieved with the structure disclosed in claim 1 of the present application. Upon detecting removal of a predetermined number of banknotes that are sorted and stacked in the sorted-banknote stacking unit, a tentative confirmation is performed of the number of unconfirmed deposited banknotes in the current transaction in the sorted-banknote stacking unit at a removal timing of the banknotes. Therefore, even when operated with the sorted-banknote stacking unit, an operability to separate transactions of the bundled banknotes can be improved, and, for example, even in an operation for fault recovery during the current transaction, an operation for redepositing all the banknotes in the current transaction and the previous transaction into the inlet port need not be performed, and even when bundled banknotes are present in the current transaction, in addition to all the banknotes that are stacked in the sorted-banknote stacking unit, it is sufficient to redeposit only the unconfirmed banknotes into the inlet port. Consequently, a work burden of the operator can be greatly reduced.

Moreover, in the banknote deposit transaction apparatus according to claim 9 of the present application, upon detecting the operation for ending the transaction, a total of the number of tentatively confirmed deposited banknotes in the bundling-object-banknote stacking unit and the number of unconfirmed deposited banknotes in the current transaction is confirmed as a total number of banknotes deposited in the current transaction of the bundling-object-banknote stacking unit, a total of the number of tentatively confirmed deposited banknotes in the sorted-banknote counting unit and the number of unconfirmed deposited banknotes in the current transaction is confirmed as a total number of banknotes deposited in the current transaction of the sorted-banknote counting unit, recording and management is performed of number of stacked banknotes that are stacked in the bundling-object-banknote stacking unit as number of loose banknotes of the previous transaction of the bundling-object-banknote stacking unit, and recording and management is performed of number of stacked banknotes that are stacked in the sorted-banknote stacking unit as number of loose banknotes of the previous transaction of the sorted-banknote stacking unit. Therefore, even when operated with the sorted-banknote stacking unit, in the operation for ending a transaction, it is needless to say that, in addition to making it possible to perform a separation of the number of deposited banknotes in the current transaction and the previous transaction, among the banknotes that are to be bundled, it is possible to confirm the number of deposited banknotes of all the deposited banknotes in the current transaction.

In the banknote deposit transaction apparatus according to claim 10 of the present application, the following advantage is achieved in addition to that achieved with the structure disclosed in claim 9 of the present application. Upon detecting the operation for fault recovery during the current transaction, and when the tentative confirmation has been made during the current transaction, the number of unconfirmed deposited banknotes in the bundling-object-banknote stacking unit and the sorted-banknote stacking unit in the current transaction are cleared, and after redepositing into the inlet port all the banknotes present inside the apparatus other than the bundled banknotes and the removed banknotes that are removed from the sorted-banknote stacking unit, the banknotes that are deposited into the inlet port are retransported. Therefore, even when operated with the sorted-banknote stacking unit, when bundled banknotes are present in the current transaction, a status of the apparatus can be restored to a banknote stacking status that was at the time of an immediate previous tentative confirmation made in the current transaction by redepositing all the banknotes inside the apparatus into the inlet port, except the bundled banknotes, without having to unbundle the bundled banknotes.

In the banknote deposit transaction apparatus according to claim 11 of the present application, the following advantage is achieved in addition to that achieved with the structure disclosed in claim 10 of the present application. Upon detecting the operation for fault recovery during the current transaction, and when the tentative confirmation was not made during the current transaction, the number of unconfirmed deposited banknotes in the bundling-object-banknote stacking unit and the sorted-banknote stacking unit in the current transaction is cleared, and after redepositing into the inlet port all the banknotes present inside the apparatus, while retaining in the bundling-object-banknote stacking unit banknotes that are being recorded and managed in the confirming unit being the number of loose banknotes in the bundling-object-banknote stacking unit in a transaction immediately before the current transaction and while retaining in the sorted-banknote stacking unit banknotes that are the number of loose banknotes of the sorted-banknote stacking unit in the transaction immediately before the current transaction, the banknotes that are redeposited into the inlet port are retransported. Therefore, even when operated with the sorted-banknote stacking unit, a status of the apparatus can be restored to a banknote stacking status that was at a time of tentative confirmation immediately before the current transaction by simply redepositing all the banknotes inside the apparatus into the inlet port.

In the banknote deposit transaction apparatus according to claim 12 of the present application, the following advantage is achieved in addition to that achieved with the structure disclosed in claim 9 of the present application. Upon detecting an operation for cancelling the current transaction, the number of tentatively confirmed deposited banknotes in the bundling-object-banknote stacking unit and the sorted-banknote stacking unit in the current transaction are cleared, and after redepositing into the inlet port banknotes, in addition to all the banknotes that are stacked in the sorted-banknote stacking unit, all the bundled banknotes including the banknotes in the current transaction in the apparatus, the banknotes that have been removed from the sorted-banknote stacking unit, and/or banknotes equivalent to the number of unconfirmed deposited banknotes, while rejecting the tentatively confirmed and unconfirmed banknotes in the bundling-object-banknote stacking unit and the sorted-banknote stacking unit in the current transaction, while retaining in the bundling-object-banknote stacking unit banknotes that are being recorded and managed in the confirming unit being the number of loose banknotes in the bundling-object-banknote stacking unit in a transaction immediately before the current transaction, while retaining in the sorted-banknote stacking unit banknotes that are the number of loose banknotes of the sorted-banknote stacking unit in the transaction immediately before the current transaction, the banknotes that are redeposited into the inlet port are retransported. Consequently, even when operated with the sorted-banknote stacking unit, all the banknote deposit transactions going on in the current transaction can be cancelled.

In the banknote deposit transaction apparatus according to claim 13 of the present application, the following advantage is achieved in addition to that achieved with the structure disclosed in claim 12 of the present application. Upon detecting the operation for cancelling the current transaction, number of bundles of all the banknotes that have been bundled including the banknotes in the current transaction is displayed as the guidance information. Consequently, an operator can recognize the number of bundles of all the bundled banknotes in the current transaction by visually checking the guidance information.

In the banknote deposit transaction method according to claim 14 of the present application configured as above, number of bundling-object-banknotes are counted as number of unconfirmed deposited banknotes; and, at a timing of bundling of a predetermined number of bundling-object-banknotes, a tentative confirmation is performed of the number of unconfirmed deposited banknotes in a current transaction among the banknotes that are to be bundled. Therefore, even when a banknote bundling function for bundling the predetermined banknotes is added, an operability of a transaction separation of the bundled banknotes can be improved, and, for example, even in an operation for fault recovery during the current transaction, an operation for redepositing all the banknotes in the current transaction and the previous transaction into the inlet port is not performed, and even when the bundled banknotes are present in the current transaction, it is sufficient to redeposit only the unconfirmed banknotes into the inlet port without unbundling the bundled banknotes. Consequently, a work burden of the operator can be greatly reduced.

In the banknote deposit transaction method according to claim 14 of the present application, upon detecting an operation for ending a transaction, a total of the number of tentatively confirmed deposited banknotes and the number of unconfirmed deposited banknotes in the current transaction is confirmed as a total number of banknotes deposited in the current transaction, and recording and management is performed of number of stacked banknotes that are stacked at the bundling-object-banknote stacking step as the number of loose banknotes of a previous transaction. Therefore, even when the banknote bundling function is added, in the operation for ending a transaction, it is needless to say that, in addition to making it possible to perform a separation of the number of deposited banknotes in the current transaction and the previous transaction, it is possible to confirm the number of deposited banknotes of all the deposited banknotes in the current transaction.

In the banknote deposit transaction method according to claim 15 of the present application, the following advantage is achieved in addition to that achieved with the method disclosed in claim 14 of the present application. Upon detecting removal of a predetermined number of banknotes that are sorted and stacked at the sorted-banknote stacking step, a tentative confirmation is performed of the number of unconfirmed deposited banknotes in the current transaction at the sorted-banknote stacking step at a removal timing of the banknotes. Therefore, even when operated with the sorted-banknote stacking step, an operability of a transaction separation of the bundled banknotes can be improved, and, for example, even in an operation for fault recovery during the current transaction, an operation for redepositing all the banknotes in the current transaction and the previous transaction need not be performed, and even when the bundled banknotes are present in the current transaction, in addition to all the banknotes that are stacked at the sorted-banknote stacking step, it is sufficient to redeposit only the unconfirmed banknotes. Consequently, a work burden of the operator can be greatly reduced.

Moreover, in the banknote deposit transaction method according to claim 15 of the present application, the following advantage is achieved in addition to that achieved with the method disclosed in claim 14 of the present application. Upon detecting the operation for ending the transaction, a total of the number of tentatively confirmed deposited banknotes at the bundling-object-banknote stacking step and the number of unconfirmed deposited banknotes in the current transaction is confirmed as a total number of banknotes deposited in the current transaction at the bundling-object-banknote stacking step, a total of the number of tentatively confirmed deposited banknotes at the sorted-banknote counting step and the number of unconfirmed deposited banknotes in the current transaction is confirmed as a total number of banknotes deposited in the current transaction at the sorted-banknote counting step, recording and management is performed of number of stacked banknotes that are stacked at the bundling-object-banknote stacking step as number of loose banknotes of the pervious transaction at the bundling-object-banknote stacking step, and recording and management is performed of number of stacked banknotes that are stacked at the sorted-banknote stacking step as number of loose banknotes of the pervious transaction at the sorted-banknote stacking step. Therefore, even when operated with the sorted-banknote stacking step, in the operation for ending a transaction, it is needless to say that, in addition to making it possible to perform a separation of the number of deposited banknotes in the current transaction and the previous transaction, among the banknotes that are to be bundled, it is possible to confirm the number of deposited banknotes of all the deposited banknotes in the current transaction.

EXPLANATIONS OF LETTERS OR NUMERALS

1: Banknote deposit transaction apparatus,
11: Hopper unit,
13: Transporting unit,
16: Stacker,
21: Bundling-object-banknote stacking unit,
22: Banknote bundling unit,
23: Bundling-object-banknote transporting unit,
31A: Stacker-side banknote-counting unit,
31B: Banknote-removal detecting unit,

41A: Bundling-side banknote-counting unit,
41B: Predetermined-number-of-banknotes detecting unit,
83: Information display unit,
100: Control unit,
101: Tentative confirming unit,
102: Confirming unit,
103: Tentative-confirmation judging unit,
104: Fault-recovery processing unit,
105: Transaction-cancellation processing unit,
110: Drive control unit

BEST MODE(S) FOR CARRYING OUT THE INVENTION

Exemplary embodiments of a banknote deposit transaction apparatus and a banknote deposit transaction method according to the present invention are explained below with reference to the accompanying drawings.

An overview of the present embodiment is explained first. The number of bundling-object-banknotes is counted as a number of unconfirmed deposited banknotes, and the number of unconfirmed banknotes deposited in a current transaction among the banknotes to be bundled is tentatively confirmed at a timing of bundling of a predetermined number of banknotes.

As a result, even if it is assumed that a banknote bundling function for bundling the predetermined number of banknotes is added, a better separation of transactions is enabled in bundled banknotes. In addition, for example, when a fault recovery process needs to be performed during the current transaction, instead of redepositing all the banknotes in the current transaction as well as the previous transaction, only the banknotes equivalent to the number of unconfirmed banknotes need to be redeposited in an inlet port. Also, if there are banknotes that have already been bundled in the current transaction, there is no need for unbundling those bundled banknotes. Consequently, associated work burden can be largely reduced.

Furthermore, in the present embodiment, in a transaction ending operation, not only can a separation of the deposited banknotes into banknotes deposited in the current transaction and those deposited in the previous transaction, among the banknotes to be bundled, be made, but also the number of all the deposited banknotes in the current transaction can be confirmed.

Figure 1:
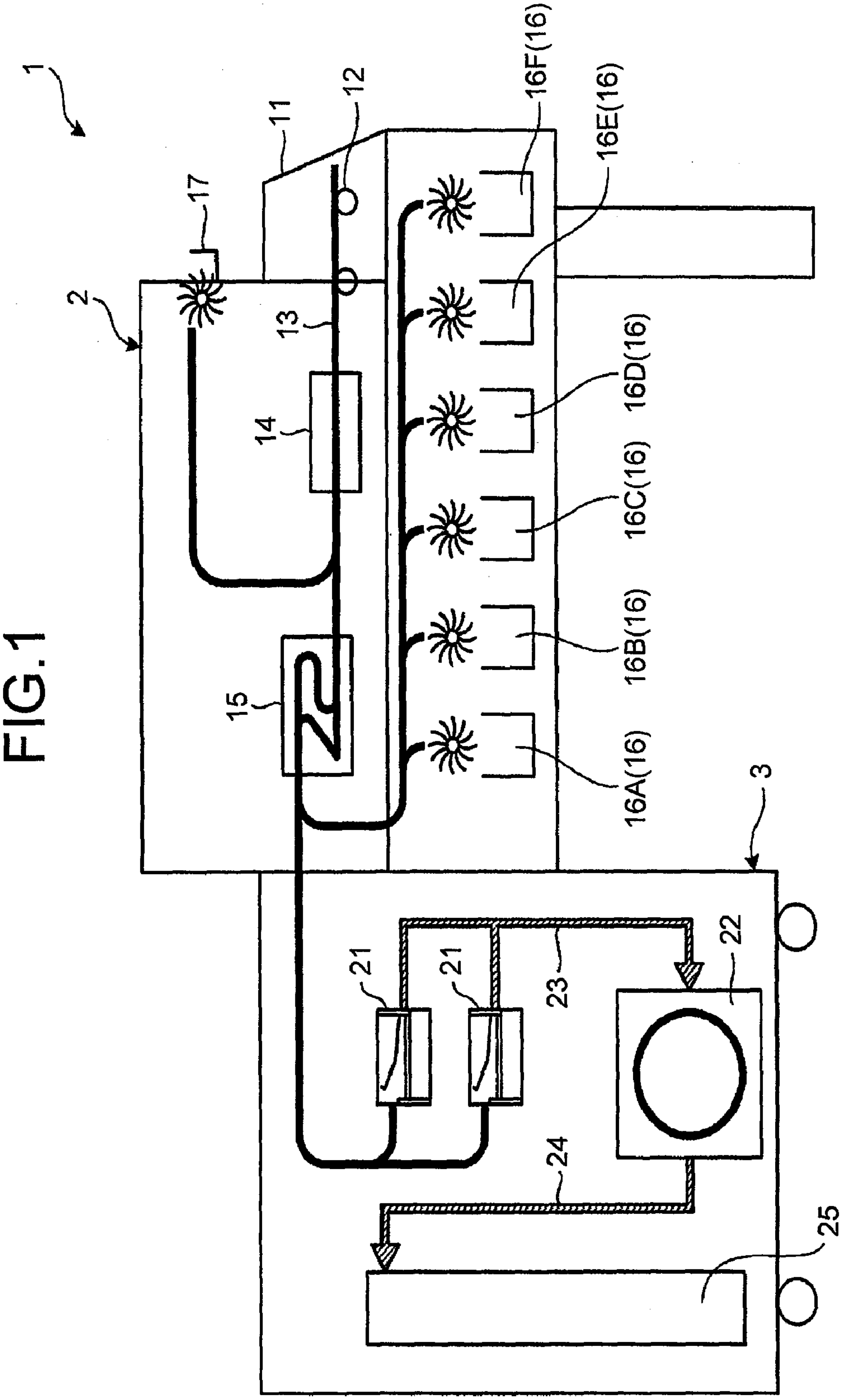
FIG. 1 is a schematic diagram of a banknote deposit transaction apparatus according to an embodiment of the present invention.
Figure 2:
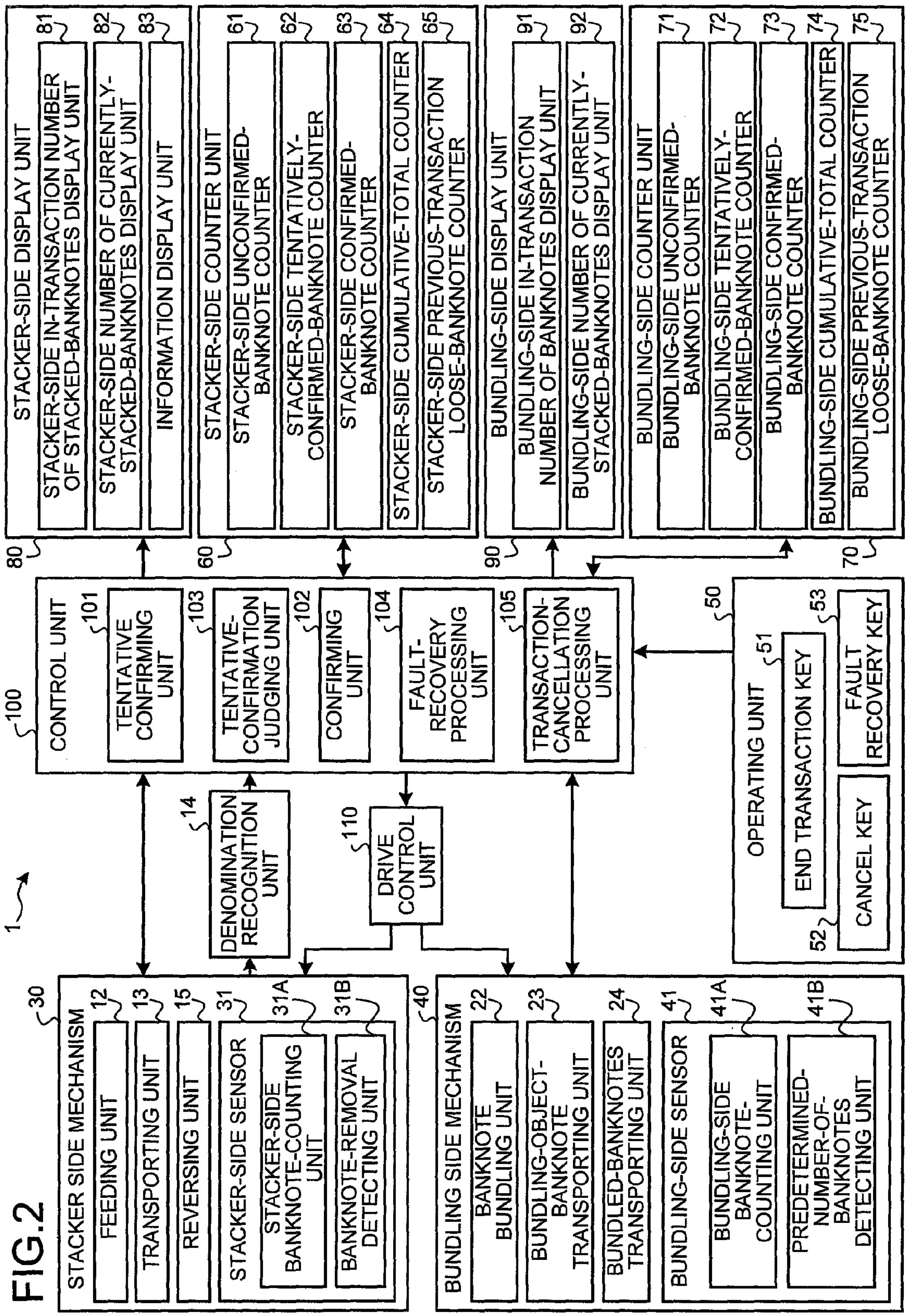
FIG. 2 is a block diagram of the banknote deposit transaction apparatus.

FIG. 1 is a schematic diagram of a banknote deposit transaction apparatus according to an embodiment of the present embodiment. FIG. 2 is a block diagram of the banknote deposit transaction apparatus.

A banknote deposit transaction apparatus 1 shown in FIG. 1 includes a banknote processing device 2 and a banknote bundling device 3, and confirms the number of deposited banknotes of deposit transactions on a per transaction basis. The banknote processing device 2 sorts and stacks banknotes by denomination in continuous deposit transactions, and counts the number of deposited banknotes for each denomination. The banknote bundling device 3 bundles the banknotes into bundles of a predetermined number of banknotes of specific denominations sorted by the banknote processing device 2.

The banknote processing device 2 includes a hopper unit 11 for putting the banknotes into the apparatus, a feeding unit 12 that feeds the banknotes put in the hopper unit 11 one by one, a transporting unit 13 that transports the banknote fed by the feeding unit 12, a denomination recognizing unit 14 that recognizes the denomination of the banknote transported by the transporting unit 13, and a reversing unit 15 that reverses the banknote transported by the transporting unit 13 so that the banknote is either front-facing or a rear-facing.

The banknote processing device 2 includes six stackers 16 corresponding to the banknote denominations in which the banknotes transported by the transporting unit 13 are sorted and stacked, and a rejecting unit 17 in which the banknotes, that do not correspond to the denominations of the stackers 16 and specific denominations corresponding to the banknote bundling device 3, are rejected. If US dollars are to be handled, for example, there are seven banknote denominations, namely, 1 dollar, 2 dollars, 5 dollars, 10 dollars, 20 dollars, 50 dollars, and 100 dollars.

Of the six stackers 16 in the banknote processing device 2, a first stacker 16A is for sorting and stacking 2 dollar banknotes, a second stacker 16B is for sorting and stacking 5 dollars banknotes, a third stacker 16C is for sorting and stacking 10 dollar banknotes, a fourth stacker 16D is for sorting and stacking 20 dollar banknotes, a fifth stacker 16E is for sorting and stacking 50 dollar banknotes, and a sixth stacker 16F is for sorting and stacking 100 dollar banknotes.

The banknote bundling device 3 includes two bundling-object-banknote stacking units 21 that sort and stack banknotes of a specific denomination, for example, one-dollar banknotes, transported through the transporting unit 13 of the banknote processing device 2, a banknote bundling unit 22 that bundles the banknotes when the number of banknotes of the specific denomination sorted and stacked in the bundling-object-banknote stacking unit 21 reaches a predetermined value, for example, 100, and a bundling-object-banknote transporting unit 23 that transports the 100 banknotes stacked in the bundling-object-banknote stacking unit 21 to the banknote bundling unit 22 as bundling object banknotes.

When the number of one-dollar banknotes stacked in the bundling-object-banknote stacking unit 21 reaches 100, a banknote-bundle removing unit (not shown) clamps and removes the 100 one-dollar banknotes stacked in the bundling-object-banknote stacking unit 21, and by a lifting action of the banknote-bundle removing unit that clamps and removes the 100 one-dollar banknotes, the bundling-object-banknote transporting unit 23 transports the 100 one-dollar banknotes to the banknote bundling unit 22.

The banknote bundling unit 22 bundles the 100 one-dollar banknotes transported by the bundling-object-banknote transporting unit 23. The bundled 100 one-dollar banknotes are treated as bundled banknotes.

The reason for providing two bundling-object-banknote stacking units 21 is that even if one bundling-object-banknote stacking unit 21 gets full, the other bundling-object-banknote stacking unit 21 can be used for stacking the banknotes of the specific denomination.

The banknote bundling device 3 further includes a bundled-banknotes stacking unit 25 for stacking the bundled banknotes bundled by the banknote bundling unit 22, and a bundled-banknotes transporting unit 24 that transports the bundled banknotes bundled by the banknote bundling unit 22 to the bundled-banknotes stacking unit 25.

FIG. 2 is a block diagram of the banknote deposit transaction apparatus 1.

As shown in FIG. 2, the banknote deposit transaction apparatus 1 includes, in addition to the denomination recognizing unit 14, a stacker side mechanism 30 in the banknote processing device 2, a bundling side mechanism 40 in the banknote bundling device 3, an operating unit 50 for inputting various commands, a drive control unit 110 that performs drive control of the stacker side mechanism 30 and the bundling side mechanism 40, and a control unit 100 that performs an overall control of the banknote deposit transaction apparatus 1.

The stacker side mechanism 30 includes, in addition to the feeding unit 12, the transporting unit 13, and the reversing unit 15, a stacker-side sensor 31 that detects a status inside the stackers 16.

The stacker-side sensor 31 includes, for each of the first to sixth stackers 16A to 16F, a stacker-side banknote-counting unit 31A, and a banknote-removal detecting unit 31B. The stacker-side banknote-counting unit 31A counts the number of banknotes stacked in the corresponding stacker 16. The banknote-removal detecting unit 31B detects removal of all the banknotes in the corresponding stacker 16 are removed.

The bundling side mechanism 40 includes, in addition to the banknote bundling unit 22, the bundling-object-banknote transporting unit 23, and the bundled-banknotes transporting unit 24, a bundling-side sensor 41 that detects a status inside the bundling-object-banknote stacking unit 21.

The bundling-side sensor 41 includes a bundling-side banknote-counting unit 41A that counts the number of banknotes stacked in the bundling-object-banknote stacking unit 21, and a predetermined-number-of-banknotes detecting unit 41B that detects, through the bundling-side banknote-counting unit 41A, when the number of banknotes stacked in the bundling-object-banknote stacking unit 21 reaches 100.

The operating unit 50 includes an End Transaction key 51 for issuing an instruction to end a deposit transaction, a Cancel key 52 for issuing an instruction to cancel a current transaction, and a Fault Recovery key 53 for issuing an instruction to recover a fault during a transaction.

The Fault Recovery key 53 corresponds to a key that initiates a fault recovery process (see FIG. 5) explained later in the event of a fault due to jamming of the banknotes inside the banknote deposit transaction apparatus 1 during a transaction. The fault recovery process restores the banknote stacking status to one that was when the last tentatively confirmation is performed during the current transaction or one immediately after completion of the previous transaction, and thereafter continues the sorting and stacking of banknotes.

The Cancel key 52 corresponds to a key that initiates a transaction cancellation process (see FIG. 7) explained later that cancels the current transaction and restores the banknote stacking status to one that was immediately after completion of the previous transaction.

The banknote deposit transaction apparatus 1 includes a stacker-side counter unit 60 that records various types of information relating to the number of stacked banknotes in the stackers 16, a bundling-side counter unit 70 that records various types of information relating to the number of stacked banknotes in the bundling-object-banknote stacking unit 21, a stacker-side display unit 80 that displays the various types of information relating to the number of stacked banknotes in the stackers 16, and a bundling-side display unit 90 that displays the various types of information relating to the number of stacked banknotes in the bundling-object-banknote stacking unit 21.

The stacker-side counter unit 60, that is, for example, provided for each of the first to sixth stackers 16A to 16F, includes a stacker-side unconfirmed-banknote counter 61, a stacker-side tentatively-confirmed-banknote counter 62, a stacker-side confirmed-banknote counter 63, a stacker-side cumulative-total counter 64, and a stacker-side previous-transaction loose-banknote counter 65.

The stacker-side unconfirmed-banknote counter 61 sequentially adds and records the number of unconfirmed banknotes being sequentially stacked in the stacker 16, that is, a stacker-side number of unconfirmed banknotes, during the current transaction.

The stacker-side tentatively-confirmed-banknote counter 62 tentatively confirms the number of unconfirmed banknotes stacked in each of the stacker 16 as the number of deposited banknotes of the current transaction at a removal timing of a predetermined number of banknotes or a reaching timing of a predetermined number of banknotes in the current transaction, and adds and records the number of tentatively-confirmed banknotes as a stacker-side number of tentatively-confirmed banknotes. The removal timing of the predetermined number of banknotes corresponds to a detection timing of the banknote-removal detecting unit 31B, and the reaching timing of the predetermined number of banknotes corresponds to a timing when the number of banknotes stacked in a corresponding one of the stackers 16 reaches the predetermined value. The predetermined value, for example, 100, is set beforehand for each of the stackers 16.

When the stacker-side number of tentatively-confirmed banknotes is added and recorded by the stacker-side tentatively-confirmed-banknote counter 62, the stacker-side unconfirmed-banknote counter 61 subtracts the added number from the stacker-side number of unconfirmed banknotes being recorded.

When the current transaction ends, the stacker-side confirmed-banknote counter 63 confirms a sum of the stacker-side number of tentatively-confirmed banknotes and the stacker-side number of unconfirmed banknotes in each of the stackers 16 as the number of deposited banknotes of the denomination corresponding to the stacker of the current transaction and records the number of confirmed banknotes as a stacker-side number of confirmed banknotes.

The stacker-side cumulative-total counter 64 records a cumulative total of the stacker-side number of confirmed banknotes stacked in the stacker 16 as a stacker-side number of cumulative-total banknotes.

When the current transaction ends, the stacker-side previous-transaction loose-banknote counter 65 treats the number of stacked banknotes in the stacker 16 as the number of loose banknotes from the previous transaction and records the number of loose banknotes from the previous transaction.

The stacker-side display unit 80, that is, for example, provided for each of the first to sixth stackers 16A to 16F, includes a stacker-side in-transaction number of stacked-banknotes display unit 81, a stacker-side number of currently-stacked-banknotes display unit 82, and an information display unit 83. The stacker-side in-transaction number of stacked-banknotes display unit 81 displays the number of banknotes that are of the current transaction and stacked in the stacker 16. The stacker-side number of currently-stacked-banknotes display unit 82 displays the number of currently stacked banknotes in the stacker 16. The information display unit 83 displays various types of guidance information.

The stacker-side in-transaction number of stacked banknotes display unit 81 displays a sum of the stacker-side number of unconfirmed banknotes recorded in the stacker-side unconfirmed-banknote counter 61 and the stacker-side number of tentatively-confirmed banknotes recorded in the stacker-side tentatively-confirmed-banknote counter 62 as in-transaction number of stacked banknotes.

The bundling-side counter unit 70 includes a bundling-side unconfirmed-banknote counter 71, a bundling-side tentatively-confirmed-banknote counter 72, a bundling-side confirmed-banknote counter 73, a bundling-side cumulative-total counter 74, and a bundling-side previous-transaction loose-banknote counter 75 of the bundling-object-banknote stacking unit 21.

The bundling-side unconfirmed-banknote counter 71 sequentially adds and records the number of unconfirmed banknotes being sequentially stacked in the bundling-object-banknote stacking unit 21, that is, bundling-side number of unconfirmed banknotes, during the current transaction.

The bundling-side tentatively-confirmed-banknote counter 72 tentatively confirms the number of unconfirmed banknotes stacked in the bundling-object-banknote stacking unit 21 as the number of deposited banknotes of the current transaction at the timing of bundling of the banknotes by the banknote bundling unit 22 during the current transaction, and adds and records the number of tentatively-confirmed banknotes as bundling-side number of tentatively-confirmed banknotes. When the bundling-side number of tentatively-confirmed banknotes is added and recorded by the bundling-side tentatively-confirmed-banknote counter 72, the bundling-side unconfirmed-banknote counter 71 subtracts the added number from the stacker-side number of unconfirmed banknotes recorded therein.

When the current transaction ends, the bundling-side confirmed-banknote counter 73 confirms a sum of the bundling-side number of unconfirmed banknotes and the bundling-side number of tentatively-confirmed banknotes stacked in the bundling-object-banknote stacking unit 21 as the number of deposited banknotes of the specific denomination during the current transaction and records the number of confirmed banknotes as bundling-side number of confirmed banknotes.

When the current transaction ends, the bundling-side previous-transaction loose-banknote counter 75 treats the number of stacked banknotes in the bundling-object-banknote stacking unit 21 as number of loose banknotes from the previous transaction and records the number of loose banknotes from the previous transaction.

The bundling-side cumulative-total counter 74 records a cumulative total number of banknotes of the specific denomination as a bundling-side number of cumulative-total banknotes.

The bundling-side display unit 90 includes a bundling-side in-transaction number of banknotes display unit 91 that displays the number of banknotes of the specific denomination during the current transaction, and a bundling-side number of currently-stacked-banknotes display unit 92 that displays the number of banknotes that is currently stacked in the bundling-object-banknote stacking unit 21.

The bundling-side in-transaction number of banknotes display unit 91 displays a sum of the bundling-side number of unconfirmed banknotes recorded in the bundling-side unconfirmed-banknote counter 71 and the bundling-side number of tentatively-confirmed banknotes recorded in the bundling-side tentatively-confirmed-banknote counter 72 as number of in-transaction banknotes.

The bundling-side number of currently-stacked-banknotes display unit 92 displays the number of currently stacked banknotes in the bundling-object-banknote stacking unit 21.

When the banknote transported by the transporting unit 13 is of the denomination that corresponds to the stacker, the drive control unit 110 controls the transporting unit 13 so that the banknote is sorted and stacked in the stacker 16 of the corresponding denomination within the banknote processing device 2. When the banknote transported by the transporting unit 13 is of the specific denomination, the drive control unit 110 controls the transporting unit 13 so that the banknote is sorted and stacked in the bundling-object-banknote stacking unit 21 within the banknote bundling device 3.

The control unit 100 includes a tentative confirming unit 101, a confirming unit 102, and a tentative-confirmation judging unit 103. The tentative confirming unit 101 tentatively confirms the number of deposited banknotes in the current transaction during the current transaction at the timing of bundling of the banknotes or at the removal timing of the banknotes (the reaching timing of the predetermined number of banknotes). The confirming unit 102 confirms the number of deposited banknotes of the current transaction in response to the operation for ending the transaction. During the fault recovery process, the tentative-confirmation judging unit 103 judges whether a tentative confirmation has been made in the current transaction before the fault.

The tentative confirming unit 101 tentatively confirms, at the timing of bundling of the banknotes during the current transaction, the bundling-side number of unconfirmed banknotes, that is the 100 banknotes, stacked in the bundling-object-banknote stacking unit 21 as the number of deposited banknotes of the specific denomination during the current transaction, and adds and records the bundling-side number of unconfirmed banknotes in the bundling-side tentatively-confirmed-banknote counter 72 as the bundling-side number of tentatively-confirmed banknotes.

Furthermore, at the removal timing of the predetermined number of banknotes detected by the banknote-removal detecting unit 31B or the reaching timing of the predetermined number of banknotes in the current transaction, the tentative confirming unit 101 tentatively confirms the stacker-side number of unconfirmed banknotes stacked in each of the stackers 16 during the current transaction as the number of deposited banknotes of the denomination corresponding to the stacker during the current transaction, and adds and records the stacker-side number of unconfirmed banknotes to the stacker-side tentatively-confirmed-banknote counter 62 as the stacker-side number of tentatively-confirmed banknotes.

When an operation of the End Transaction key 51 is detected, that is, when the operation for ending a transaction is detected during the current transaction, the current transaction needs to be ended. In this event, the confirming unit 102 confirms a sum of the bundling-side number of tentatively confirmed banknotes recorded in the bundling-side tentatively-confirmed-banknote counter 72 and the bundling-side number of unconfirmed banknotes recorded in the bundling-side unconfirmed-banknote counter 71 as the number of deposited banknotes of the specific denomination during the current transaction, and records the sum in the bundling-side confirmed-banknote counter 73 as the bundling-side number of confirmed banknotes of the current transaction.

Furthermore, upon recording of the bundling-side number of confirmed banknotes of the current transaction in the bundling-side confirmed-banknote counter 73, the confirming unit 102 records the number of stacked banknotes in the bundling-object-banknote stacking unit 21 as the number of loose banknotes from the previous transaction in the bundling-side previous-transaction loose-banknote counter 75.

When the operation for ending a transaction is detected during the current transaction, the confirming unit 102 confirms, for each of the stackers 16, the sum of the stacker-side number of tentatively-confirmed banknotes recorded in the stacker-side tentatively-confirmed-banknote counter 62 and the stacker-side number of unconfirmed banknotes recorded in the stacker-side unconfirmed-banknote counter 61 as the number of deposited banknotes of the denomination corresponding to the stacker during the current transaction, and records the sum as the stacker-side number of confirmed banknotes in the stacker-side confirmed-banknote counter 63.

Furthermore, when the stacker-side number of confirmed banknotes in the current transaction is recorded in the stacker-side confirmed-banknote counter 63, the confirming unit 102 records the number of stacked banknotes in the stacker 16 as the number of loose banknotes from the previous transaction in the stacker-side previous-transaction loose-banknote counter 65.

The confirming unit 102 thus outputs the number of deposited banknotes per denomination during the current transaction based on the bundling-side number of confirmed banknotes recorded in the bundling-side confirmed-banknote counter 73, and each of the stackers-side number of confirmed banknotes recorded as the stackers-side number of confirmed banknotes of each stacker.

The confirming unit 102 adds the bundling-side number of confirmed banknotes recorded in the bundling-side confirmed-banknote counter 73 to the bundling-side cumulative-total counter 74 in which the bundling-side number of cumulative-total banknotes up to the previous transaction is recorded, and updates the bundling-side number of cumulative-total banknotes.

The confirming unit 102 adds, for each of the stackers 16, the stacker-side number of confirmed banknotes recorded in the stacker-side confirmed-banknote counter 63 to the stacker-side number of cumulative-total banknotes that are stacked in the stacker 16 up to the previous transaction and recorded in the stacker-side cumulative-total counter 64, and updates the stacker-side number of cumulative-total banknotes.

The control unit 100 includes a fault-recovery processing unit 104 that performs operations relating to the fault recovery process, and a transaction-cancellation processing unit 105 that performs operations relating to the transaction cancellation process.

When an operation of the Cancel key 52 is detected, that is, when an operation for canceling a transaction is detected during the current transaction, the transaction-cancellation processing unit 105 judges, based on the bundling-side number of tentatively-confirmed banknotes recorded in the bundling-side tentatively-confirmed-banknote counter 72, whether there are bundled banknotes that include banknotes of the current transaction. If such bundled banknotes are present, the transaction-cancellation processing unit 105 displays the number of such banknote bundles as guidance information on the information display unit 83. Otherwise, the transaction-cancellation processing unit 105 displays a message indicating the absence of such bundled banknotes as guidance information on the information display unit 83.

From the guidance information displayed on the information display unit 83 an operator recognizes the number of banknote bundles including the banknotes of the current transaction, collects the unbundled banknotes from these bundles after unbundling them along with the number, unconfirmed banknotes stacked in the bundling-object-banknote stacking unit 21, and all the banknotes stacked in all the stackers 16, and redeposits the collected banknotes in the hopper unit 11.

The transaction-cancellation processing unit 105 starts a sorting and stacking operation of the redeposited collected banknotes through the drive control unit 110, and monitors whether the number of stacked banknotes in the bundling-object-banknote stacking unit 21 has reached the number of loose banknotes from the previous transaction recorded in the bundling-side previous-transaction loose-banknote counter 75, and whether the number of stacked banknotes in each of the stackers 16 has reached the number of loose banknotes from the previous transaction recorded in the stacker-side previous-transaction loose-banknote counter 65.

If during the sorting and stacking operation of the redeposited collected banknotes, the number of stacked banknotes in the bundling-object-banknote stacking unit 21 reaches the number of loose banknotes from the previous transaction recorded in the bundling-side previous-transaction loose-banknote counter 75, after that point until the end of the sorting and stacking operation, the transaction-cancellation processing unit 105 rejects even the banknotes of the denomination that correspond to the bundling-object-banknote stacking unit 21 to the rejecting unit 17.

Similarly, if during the sorting and stacking operation of the redeposited collected banknotes, the number of stacked banknotes in each of the stackers 16 reaches the number of loose banknotes from the previous transaction recorded in the stacker-side previous-transaction loose-banknote counter 65, after that point until the end of the sorting and stacking operation, the transaction-cancellation processing unit 105 rejects even the banknotes of denomination that correspond to the stackers 16 to the rejecting unit 17.

As a result, after the sorting and stacking operation of the redeposited collected banknotes by the transaction-cancellation processing unit 105, and all the banknotes deposited in the current transaction are collected from the rejecting unit 17, the banknote stacking status is restored to the one that was immediately before the start of the current transaction.

If a fault, such as jamming, occurs during the current transaction, and the fault is cleared, the operator collects the unconfirmed banknotes stacked in the bundling-object-banknote stacking unit 21 and all the banknotes stacked in all the stackers 16, excluding the bundled banknotes and the banknotes removed from the stackers 16, and redeposits the collected banknotes in the hopper unit 11.

When an operation of the Fault Recovery key 53 is detected, that is, when an operation for fault recovery is detected after the collected banknotes are redeposited in the hopper unit 11, the fault-recovery processing unit 104 judges whether the tentative-confirmation judging unit 103 has judged that a tentative confirmation has been made in the current transaction.

If the tentative-confirmation judging unit 103 has judged that a tentative confirmation has been made in the current transaction, and the tentative confirmation has been made at the timing of bundling of the banknotes, the fault-recovery processing unit 104 starts the sorting and stacking operation of the redeposited collected banknotes, and monitors whether the number of stacked banknotes in the stacker 16, for which no tentative confirmation has been made, has reached the number of loose banknotes from the previous transaction recorded in the stacker-side previous-transaction loose-banknote counter 65.

When starting the sorting and stacking operation of the redeposited collected banknotes, the control unit 100 displays a stacker-side number of loose banknotes from the previous transaction as a negative value on the stacker-side number of currently-stacked-banknotes display unit 82. For example, if the number of loose banknotes from the previous transaction is 70, the display on the stacker-side number of currently-stacked-banknotes display unit 82 would be "−70". As the collected banknotes are stacked in the corresponding stacker 16, the value displayed on the stacker-side number of currently-stacked-banknotes display unit 82 changes as follows: "−70"→"−69"→"−68"→ . . . →"−1". Thereafter, when the number of stacked banknotes in the stacker 16 reaches the number of loose banknotes from the previous transaction, the display on the stacker-side number of currently-stacked-banknotes display unit 82 changes to a normal display of "70", that is, the number of currently stacked banknotes in the stacker 16. As a result, the operator can know how much the banknotes are falling short for returning to a banknote stacking status that was at the time of the last tentative confirmation was made in the current transaction by looking at the display on the stacker-side number of currently-stacked-banknotes display unit 82.

During the sorting and stacking operation of the redeposited collected banknotes, when the number of stacked banknotes in the stacker 16, for which no tentative confirmation has been made, reaches the stacker-side number of loose banknotes of the previous transaction, the fault-recovery processing unit 104 returns the banknote stacking status of the stacker 16 to one that was at the time of the last tentative confirmation was made in the current transaction.

If the tentative-confirmation judging unit 103 judges that a tentative confirmation has been made in the current transaction, and that the tentative confirmation has been made at the removal timing of the predetermined number of banknotes or the reaching timing of the predetermined number of banknotes in the current transaction, the fault-recovery processing unit 104 starts the sorting and stacking operation of the redeposited collected banknotes, and monitors whether the number of stacked banknotes in the bundling-object-banknote stacking unit 21 has reached the number of loose banknotes from the previous transaction recorded in the bundling-side previous-transaction loose-banknote counter 75, and whether the number of stacked banknotes in the stacker 16, for which no tentative confirmation has been made in the current transaction, has reached the number of loose banknotes from the previous transaction recorded in the stacker-side previous-transaction loose-banknote counter 65.

An explanation is given about that the control unit 100 displays a negative value on the stacker-side number of currently-stacked-banknotes display unit 82 at the start of the sorting and stacking operation of the redeposited collected banknotes. The same holds true for the bundling-side number of currently-stacked-banknotes display unit 92 of the bundling-object-banknote stacking unit 21. For example, if the number of loose banknotes from the previous transaction is 70, the display on the bundling-side number of currently-stacked-banknotes display unit 92 would be "−70". As the collected banknotes are stacked in the bundling-object-banknote stacking unit 21, the value displayed on the bundling-side number of currently-stacked-banknotes display unit 92 changes as follows: "−70"→"−69"→"−68"→ . . . →"−1". Thereafter, when the number of stacked banknotes in the bundling-object-banknote stacking unit 21 reaches the number of loose banknotes from the previous transaction, the display changes to a normal display of "70", that is, the number of currently stacked banknotes in the bundling-object-banknote stacking unit 21.

During the sorting and stacking operation of the redeposited collected banknotes, when the number of stacked banknotes in the bundling-object-banknote stacking unit 21 reaches the number of loose banknotes from the previous transaction recorded in the bundling-side previous-transaction loose-banknote counter 75, the fault-recovery processing unit 104 returns the banknote stacking status of the bundling-object-banknote stacking unit 21 to one that was at the time of the last tentative confirmation in the current transaction.

During the sorting and stacking operation of the redeposited collected banknotes, when the number of stacked banknotes in the stacker 16, for which no tentative confirmation has been made during the current transaction, has reached the number of loose banknotes from the previous transaction recorded in the stacker-side previous-transaction loose-banknote counter 65, or has reached the sum of the stacker-side number of tentatively confirmed banknotes that was at the time of the last tentative confirmation was made in the current transaction and the stacker-side number of cumulative-total banknotes of the previous transaction, the fault-recovery processing unit 104 returns the banknote stacking status of each of the stackers 16 to the corresponding one that was at the time of the tentative confirmation immediately before the current transaction.

If the tentative-confirmation judging unit 103 judges that no tentative confirmation has been made in the current transaction, the fault-recovery processing unit 104 monitors whether the number of stacked banknotes in the bundling-object-banknote stacking unit 21 has reached the number of loose banknotes from the previous transaction recorded in the bundling-side previous-transaction loose-banknote counter 75, and whether the number of stacked banknotes in the stacker 16, for which no tentative confirmation has been made, has reached the number of loose banknotes from the previous transaction recorded in the stacker-side previous-transaction loose-banknote counter 65.

During the sorting and stacking operation of the redeposited collected banknotes, when the number of stacked banknotes in the bundling-object-banknote stacking unit 21 reaches the number of loose banknotes from the previous transaction, the fault-recovery processing unit 104 returns the banknote stacking status of the bundling-object-banknote stacking unit 21 to one that was at the start of the current transaction.

During the sorting and stacking operation of the redeposited collected banknotes, when the number of stacked banknotes in the stacker 16, for which no tentative confirmation has been made, has reached the number of loose banknotes from the previous transaction recorded in the stacker-side previous-transaction loose-banknote counter 65, the fault-recovery processing unit 104 returns the banknote stacking status of each of the stackers 16 to the corresponding one that was at the start of the current transaction.

In the claims of the present application, a banknote deposit transaction apparatus corresponds to the banknote deposit transaction apparatus 1; an inlet port corresponds to the hopper unit 11; a transporting unit corresponds to the transporting unit 13 and the bundling-object-banknote transporting unit 23; a bundling-object-banknote stacking unit corresponds to the bundling-object-banknote stacking unit 21; a bundling-object-banknote counting unit corresponds to the bundling-side banknote-counting unit 41A; a banknote bundling unit corresponds to the banknote bundling unit 22; a tentative confirming unit corresponds to the tentative confirming unit 101, the predetermined-number-of-banknotes detecting unit 41B, and the banknote-removal detecting unit 31B; a confirming unit corresponds to the confirming unit 102; a tentative-confirmation judging unit corresponds to the tentative-confirmation judging unit 103; a control unit corresponds to the drive control unit 110, the fault-recovery processing unit 104, and the transaction-cancellation processing unit 105; a display unit corresponds to the information display unit 83; a sorted-banknote stacking unit corresponds to the stacker 16; and a sorted-banknote counting unit corresponds to the stacker-side banknote-counting unit 31A.

Figure 3:
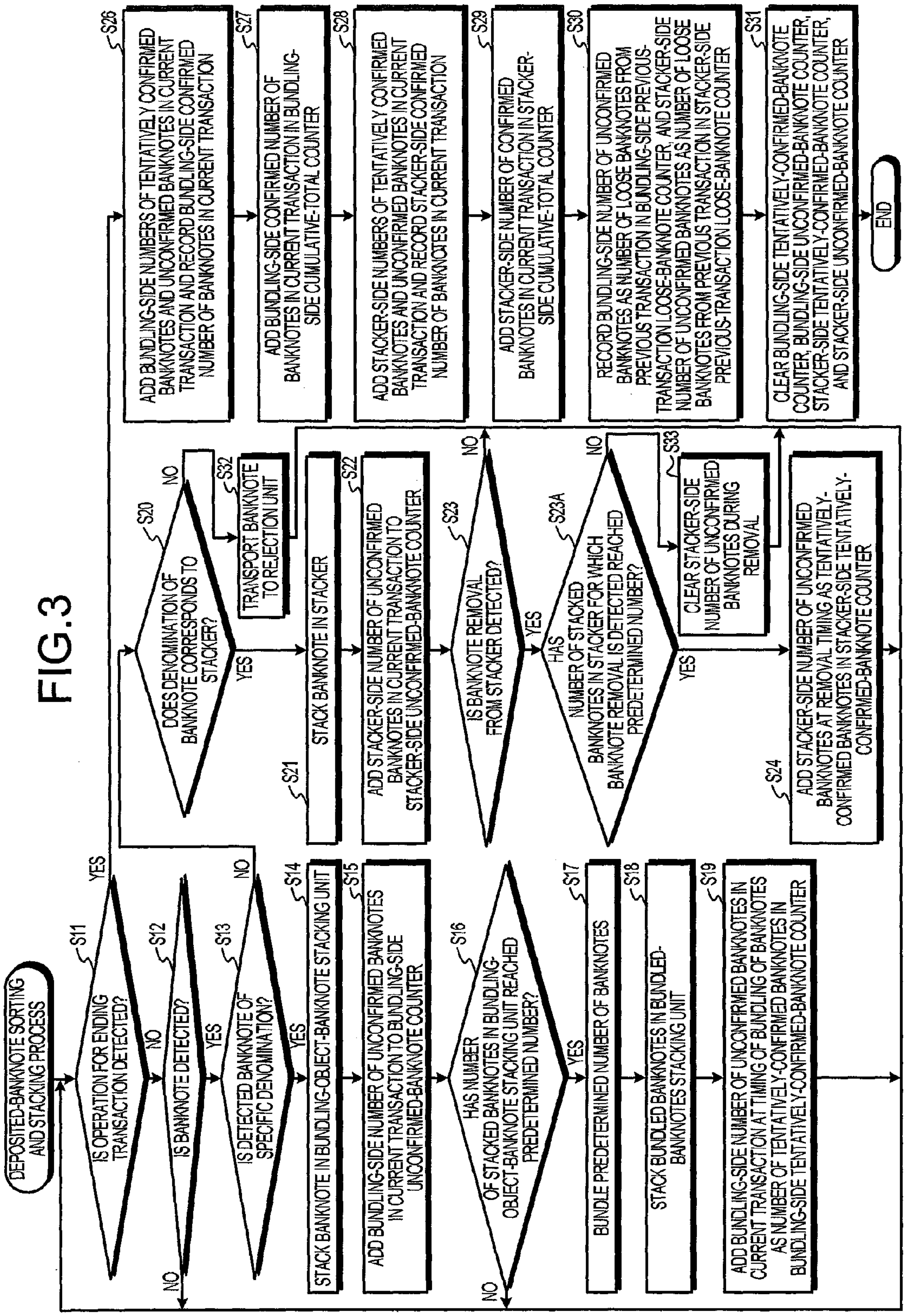
FIG. 3 is a flowchart of a processing operation of a control unit relating to a deposited-banknote sorting and stacking process of the banknote deposit transaction apparatus.

An operation of the banknote deposit transaction apparatus 1 according to the present embodiment is explained next. FIG. 3 is a flowchart of a processing operation of the control unit 100 relating to a deposited-banknote sorting and stacking process of the banknote deposit transaction apparatus 1.

The deposited-banknote sorting and stacking process shown in FIG. 3 is a process for counting the deposited banknotes per denomination on a per transaction basis.

The operator starts a transaction commencement operation after depositing the banknotes of the current transaction in the hopper unit 11.

The control unit 100 of the banknote deposit transaction apparatus 1 provides a control to sequentially sort the banknotes deposited in the hopper unit 11 per denomination and stack the banknotes sequentially in the bundling-object-banknote stacking unit 21 or the stacker 16 based on the denomination.

The control unit 100 judges whether the operation for ending the transaction during the current transaction has been made by operation of the End Transaction key 51 (Step S11).

If no operation of ending the transaction during the current transaction is detected (No at Step S11), the control unit 100 judges whether the denomination recognizing unit 14 arranged on a transport path detects the banknote (Step S12).

If the banknote is detected (Yes at Step S12), the control unit 100 judges whether the detected banknote is of a specific denomination (Step S13).

If the detected banknote is of the specific denomination (Yes at Step S13), the control unit 100 judges the banknote as a bundling object banknote, and controls the transporting unit 13 to stack the banknote in the bundling-object-banknote stacking unit 21 (Step S14).

Every time the banknote is stacked in the bundling-object-banknote stacking unit 21, the control unit 100 adds the bundling-side number of unconfirmed banknotes in the current transaction to the bundling-side unconfirmed-banknote counter 71 (Step S15). Meanwhile, every time a banknote is stacked in the bundling-object-banknote stacking unit 21, the bundling-side banknote-counting unit 41A increments the bundling-side unconfirmed-banknote counter 71 by 1.

Once the bundling-side number of unconfirmed banknotes in the current transaction is added in the bundling-side unconfirmed-banknote counter 71, the control unit 100 judges whether the predetermined-number-of-banknotes detecting unit 41B detects that the number of stacked banknotes in the bundling-object-banknote stacking unit 21 has reached a predetermined number (Step S16).

If the number of stacked banknotes in the bundling-object-banknote stacking unit 21 has reached the predetermined number (Yes at Step S16), the control unit 100 causes the bundling-object-banknote transporting unit 23 to transport the predetermined number of banknotes to the banknote bundling unit 22, and causes the banknote bundling unit 22 to bundle the predetermined number of banknotes (Step S17).

The control unit treats the predetermined number of banknotes bundled by the banknote bundling unit 22 as the bundled banknotes, and causes the bundled-banknotes transporting unit 24 to transport the bundled banknotes to the bundled-banknotes stacking unit 25, and causes bundled-banknotes stacking unit 25 to stack the bundled banknotes (Step S18).

The tentative confirming unit 101 within the control unit 100 tentatively confirms the predetermined number of banknotes of the specific denomination, recorded as the bundling-side number of unconfirmed banknotes in the bundling-side unconfirmed-banknote counter 71 at the timing of bundling of the banknotes by the banknote bundling unit 22 at Step S17 during the current transaction, as the number of deposited banknotes, and adds and records the bundling-side number of unconfirmed banknotes as the bundling-side number of tentatively-confirmed banknotes in the bundling-side tentatively-confirmed-banknote counter 72 (Step S19). Thereafter, the process procedure returns to Step S11 to judge whether the operation for ending the transaction is detected during the current transaction. If the bundling-side number of unconfirmed banknotes is added and recorded to the bundling-side number of tentatively-confirmed banknotes in the bundling-side tentatively-confirmed-banknote counter 72, the control unit 100 subtracts the added number from the bundling-side number of unconfirmed banknotes recorded in the bundling-side unconfirmed-banknote counter 71.

If it is detected at Step S13 that the banknote is not of the specific denomination (No at Step S13), the control unit 100 judges whether the banknote is of a denomination that corresponds to the stacker (Step S20). If the banknote is of the denomination that corresponds to the stacker (Yes at Step S20), the control unit 100 causes the transporting unit 13 to stack the banknote in the stacker 16 corresponding to the denomination (Step S21).

Once the banknote is stacked in the stacker 16 corresponding to the denomination, the control unit 100 adds and records the stacker-side number of unconfirmed banknotes in the current transaction to the stacker-side unconfirmed-banknote counter 61 (Step S22). Every time a banknote is stacked in the stacker 16, the stacker-side banknote-counting unit 31A increments the stacker-side unconfirmed-banknote counter 61 by 1. The stacker-side unconfirmed-banknote counter 61 indicates the stacker-side number of unconfirmed banknotes.

Once the stacker-side number of unconfirmed banknotes in the current transaction is added to the stacker-side unconfirmed-banknote counter 61, the control unit 100 judges whether the banknote-removal detecting unit 31B detects banknote removal (Step S23).

If banknote removal is detected (Yes at Step S23), the tentative confirming unit 101 judges whether the number of stacked banknotes in the stacker 16, for which banknote removal is detected, has reached a predetermined number (Step S23A). If the number of stacked banknotes in the stacker 16, for which banknote removal is detected, has reached a predetermined number (Yes at Step S23A), the tentative confirming unit 101 tentatively confirms the stacker-side number of unconfirmed banknotes, recorded in each of the stackers-side unconfirmed-banknote counter 61 at the time of removal of the banknotes or at the time when the predetermined number of banknotes is reached during the current transaction, as the number of deposited banknotes of the denomination corresponding to the stacker, and adds the stacker-side number of unconfirmed banknotes as the stacker-side tentatively-confirmed banknotes in the stacker-side tentatively-confirmed-banknote counter 62 (Step S24). Thereafter, the process procedure returns to Step S11 to judge whether the operation for ending the transaction has been detected during the current transaction. If the stacker-side number of unconfirmed banknotes is added and recorded to the stacker-side number of tentatively-confirmed banknotes in the stacker-side tentatively-confirmed-banknote counter 62, the control unit 100 subtracts the added number from the stacker-side number of unconfirmed banknotes recorded in the stacker-side unconfirmed-banknote counter 61.

Upon detection of the operation for ending the transaction during the current transaction (Yes at Step S11), the confirming unit 102 within the control unit 100 confirms the sum of the bundling-side number of tentatively confirmed banknotes recorded in the bundling-side tentatively-confirmed-banknote counter 72 and the bundling-side number of unconfirmed banknotes recorded in the bundling-side unconfirmed-banknote counter 71 as the number of deposited banknotes of the specified denomination, and records the sum in the bundling-side confirmed-banknote counter 73 as the bundling-side number of confirmed banknotes of the current transaction (Step S26).

Furthermore, the confirming unit 102 adds and records the bundling-side number of confirmed banknotes in the current transaction as the bundling-side number of cumulative-total banknotes in the bundling-side cumulative-total counter 74 (Step S27).

Furthermore, the confirming unit 102 confirms the sum of the stacker-side number of tentatively-confirmed banknotes recorded in the stacker-side tentatively-confirmed-banknote counter 62 and the stacker-side number of unconfirmed banknotes recorded in the stacker-side unconfirmed-banknote counter 61 of each of the stackers in the current transaction as the number of deposited banknotes of the denomination corresponding to the stacker during the current transaction, and records the sum as the stacker-side number of confirmed banknotes in the current transaction in the stacker-side confirmed-banknote counter 63 (Step S28).

Moreover, the confirming unit 102 adds and records the stacker-side number of confirmed banknotes in the current transaction as the stacker-side number of cumulative-total banknotes in the stacker-side cumulative-total counter 64 (Step S29).

The confirming unit 102 records the number of stacked banknotes in the bundling-object-banknote stacking unit 21 as the number of loose banknotes from the previous transaction in the bundling-side previous-transaction loose-banknote counter 75, and the number of banknotes stacked in the stacker as the number of loose banknotes from the previous transaction in the stacker-side previous-transaction loose-banknote counter 65 (Step S30).

The confirming unit 102 clears the bundling-side number of tentatively-confirmed banknotes in the bundling-side tentatively-confirmed-banknote counter 72, the bundling-side number of unconfirmed banknotes in the bundling-side unconfirmed-banknote counter 71, the stacker-side number of tentatively-confirmed banknotes in the stacker-side tentatively-confirmed-banknote counter 62, and the stacker-side number of unconfirmed banknotes in the stacker-side unconfirmed-banknote counter 61 (Step S31), ends the current transaction, and ends the process procedure shown in FIG. 3.

If no banknote is detected at Step S12 (No at Step S12), the process control proceeds to Step S11 to judge whether an operation for ending the transaction is detected.

If the number of stacked banknotes in the bundling-object-banknote stacking unit 21 has not reached the predetermined number at Step S16 (No at Step S16), the process control proceeds to Step S11 to judge whether an operation for ending the transaction is detected.

If no banknote removal is detected at Step S23 (No at Step S23), the process control proceeds to Step S11 to judge whether an operation for ending the transaction is detected.

If the banknote is not of the specific denomination corresponding to the stacker at Step S20 (No at Step S20), the control unit 100 causes the banknote to be transported to the rejecting unit 17 (Step S32), and the process control proceeds to Step S11.

If the number of stacked banknotes in the stacker 16, in which banknote removal is detected, has not reached the predetermined number at Step S23A (No at Step S23A), the control unit 100 clears the number of unconfirmed banknotes of the stacker 16 when the removal is detected (Step S33), and the process control proceeds to Step S11.

In the deposited-banknote sorting and stacking process shown in FIG. 3, the bundling-side number of unconfirmed banknotes recorded in the bundling-side unconfirmed-banknote counter 71 during the current transaction at the timing of bundling of the banknotes by the banknote bundling unit 22 is tentatively confirmed as the number of deposited banknotes of the specific denomination, and the bundling-side number of unconfirmed banknotes is added and recorded as the bundling-side number of tentatively-confirmed banknotes in the bundling-side tentatively-confirmed-banknote counter 72. That is, the subsequent work burden can be reduced by tentatively confirming the deposited banknotes of the specific denomination during the current transaction at the timing of bundling of the banknotes.

In the deposited-banknote sorting and stacking process, when banknote removal from the stacker 16 is detected or when the number of stacked banknotes in the stacker 16 for which banknote removal is detected has reached the predetermined number, the stacker-side number of unconfirmed banknotes recorded in each of the stackers-side unconfirmed-banknote counter 61 at the removal timing of the predetermined number of banknotes or the reaching timing of the predetermined number of banknotes during the current transaction is tentatively confirmed as the number of deposited banknotes of the denomination corresponding to the stacker, and the stacker-side number of unconfirmed banknotes is added and recorded as the stacker-side number of tentatively-confirmed banknotes in the stacker-side tentatively-confirmed-banknote counter 62. That is, the subsequent work burden can be reduced by tentatively confirming the deposited banknotes of the denomination corresponding to the stacker during the current transaction at the removal timing of the banknotes or at the reaching timing of the predetermined number of banknotes.

In the deposited-banknote sorting and stacking process, when the operation for ending the transaction is detected, the total number of tentatively confirmed banknotes and the number of unconfirmed banknotes deposited in the current transaction are confirmed as the total number of banknotes deposited in the current transaction. Furthermore, the number of stacked banknotes in the bundling-object-banknote stacking unit 21 and the number of stacked banknotes in the stacker 16 are recorded and managed as the number of loose banknotes from the previous transaction. Consequently, in response to the operation for ending the transaction, not only can a separation of the banknotes in a banknote bundle into banknotes deposited in the current transaction and the previous transactions be made, but also the number of all the deposited banknotes in the current transaction can be confirmed.

Figure 4:
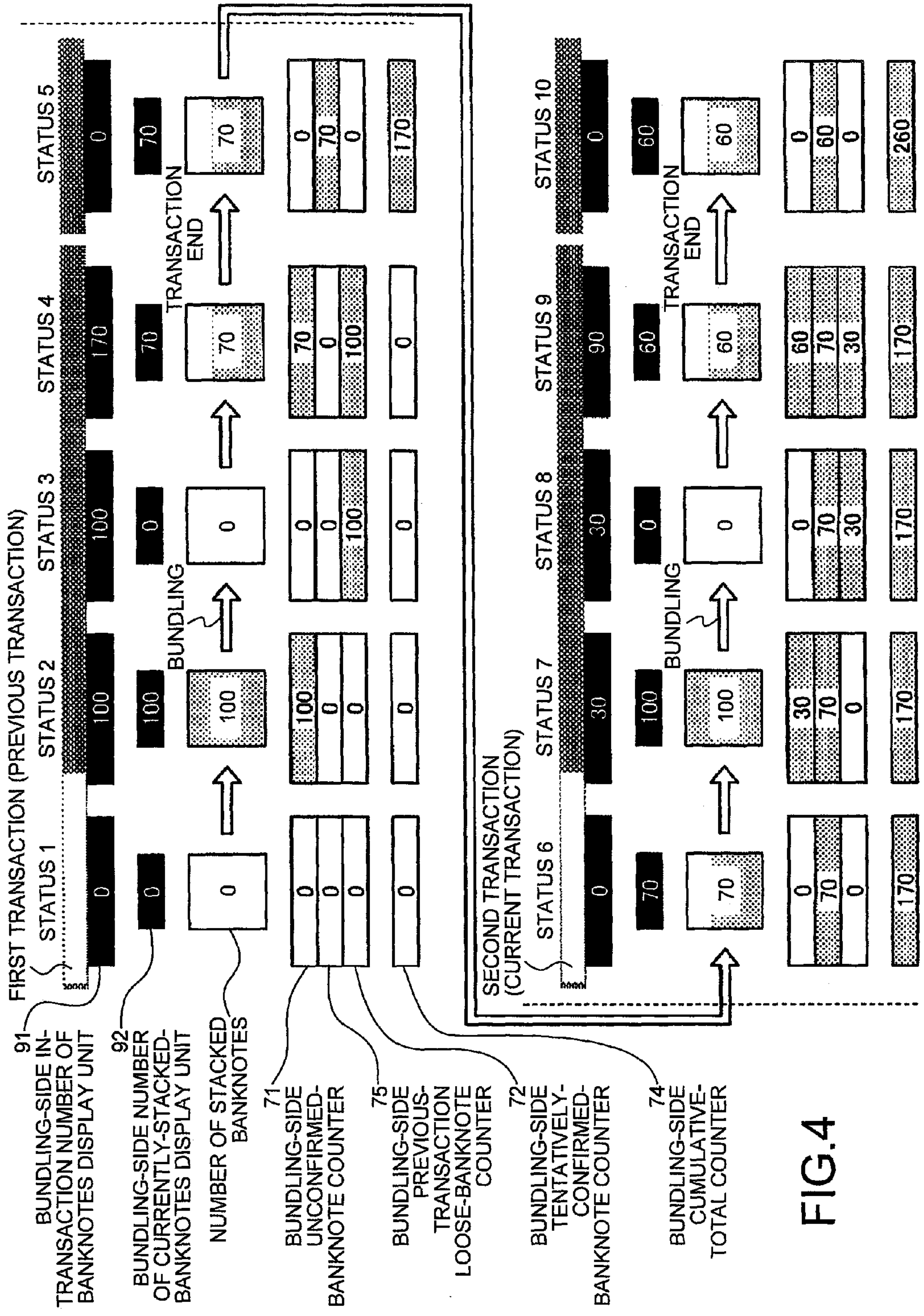
FIG. 4 is a drawing for clearly explaining status transitions of a bundling-object-banknote stacking unit, a bundling-side counter unit, and a bundling-side display unit during a normal transaction.

FIG. 4 is a drawing for clearly explaining status transitions of the bundling-object-banknote stacking unit 21, the bundling-side counter unit 70, and the bundling-side display unit 90 during a normal transaction.

At the start of a first transaction, the number of stacked banknotes in the bundling-object-banknote stacking unit 21 is "0"; therefore, the bundling-side unconfirmed-banknote counter 71, the bundling-side tentatively-confirmed-banknote counter 72, the bundling-side cumulative-total counter 74, the bundling-side previous-transaction loose-banknote counter 75, the bundling-side in-transaction number of banknotes display unit 91, and the bundling-side number of currently-stacked-banknotes display unit 92 all show "0" (Status 1).

Now, assume that 100 banknotes of the specific denomination are stacked in the bundling-object-banknote stacking unit 21 one by one. Then, after completion of stacking of the 100th banknote, the number of stacked banknotes in the bundling-object-banknote stacking unit 21 becomes "100"; therefore, the bundling-side unconfirmed-banknote counter 71 shows "100", the bundling-side tentatively-confirmed-banknote counter 72 shows "0", the bundling-side cumulative-total counter 74 shows "0", the bundling-side previous-transaction loose-banknote counter 75 shows "0", the bundling-side in-transaction number of banknotes display unit 91 shows "100", and the bundling-side number of currently-stacked-banknotes display unit 92 shows "100" (Status 2).

When all the 100 banknotes of the specific denomination stacked in the bundling-object-banknote stacking unit 21 is transported to the banknote bundling unit 22 for bundling, the number of stacked banknotes in the bundling-object-banknote stacking unit 21 becomes "0"; therefore, the bundling-side unconfirmed-banknote counter 71 shows "0", the bundling-side cumulative-total counter 74 shows "0", the bundling-side previous-transaction loose banknote, counter 75 shows "0", the bundling-side tentatively-confirmed-banknote counter 72 shows "100", the bundling-side number of currently-stacked-banknotes display unit 92 shows "0", and the bundling-side in-transaction number of banknotes display unit 91 shows "100" (Status 3).

Now, assume that 70 banknotes of the specific denomination are stacked anew in the bundling-object-banknote stacking unit 21 one by one. Then, after completion of stacking of the 70th banknote the number of stacked banknotes in the bundling-object-banknote stacking unit 21 becomes "70"; therefore, the bundling-side unconfirmed-banknote counter 71 shows "70", the bundling-side tentatively-confirmed-banknote counter 72 shows "100", the bundling-side cumulative-total counter 74 shows "0", the bundling-side previous-transaction loose-banknote counter 75 shows "0", the bundling-side in-transaction number of banknotes display unit 91 shows "170", and the bundling-side number of currently-stacked-banknotes display unit 92 shows "70" (Status 4).

Upon detecting an operation for ending the first transaction, the number of stacked banknotes in the bundling-object-banknote stacking unit 21 is "70" at the time of ending the current transaction; therefore, the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "0", and the bundling-side number of currently-stacked-banknotes display unit 92 shows "70" (Status 5).

Status 5 of the previous transaction is carried over when beginning the next transaction (Status 6).

Now, assume that 30 banknotes of the specific denomination are stacked anew in the bundling-object-banknote stacking unit 21 one by one. Then, after completion of stacking of the 30th banknote the number of stacked banknotes in the bundling-object-banknote stacking unit 21 becomes "100"; therefore, the bundling-side unconfirmed-banknote counter 71 shows "30", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "30", and the bundling-side number of currently-stacked-banknotes display unit 92 shows "100" (Status 7).

When the 100 banknotes of the specific denomination stacked in the bundling-object-banknote stacking unit 21 are transported to the banknote bundling unit 22 for bundling, the number of stacked banknotes in the bundling-object-banknote stacking unit 21 becomes "0"; therefore, the bundling-side unconfirmed-banknote counter 71 shows "0", the bundling-side tentatively-confirmed-banknote counter 72 shows "30", the bundling-side previous-transaction loose-banknote counter 75 shows "70", the bundling-side cumulative-total counter 74 shows "170", the bundling-side in-transaction number of banknotes display unit 91 shows "30", and the bundling-side number of currently-stacked-banknotes display unit 92 shows "0" (Status 8).

Now, assume that 60 banknotes of the specific denomination are stacked anew in the bundling-object-banknote stacking unit 21 one by one. Then, the number of stacked banknotes in the bundling-object-banknote stacking unit 21 becomes "60"; therefore, the bundling-side unconfirmed-banknote counter 71 shows "60", the bundling-side tentatively-confirmed-banknote counter 72 shows "30", the bundling-side cumulative-total counter 74 shows "170", the bundling-side previous-transaction loose-banknote counter 75 shows "70", the bundling-side in-transaction number of banknotes display unit 91 shows "90", and the bundling-side number of currently-stacked-banknotes display unit 92 shows "60" (Status 9).

Upon detecting an operation for ending the second transaction, the number of stacked banknotes in the bundling-object-banknote stacking unit 21 is "60" at the time of ending the current transaction; therefore, the bundling-side unconfirmed-banknote counter 71 shows "0", the bundling-side tentatively-confirmed-banknote counter 72 shows "0", the bundling-side cumulative-total counter 74 shows "260", the bundling-side previous-transaction loose-banknote counter 75 shows "60", the bundling-side in-transaction number of banknotes display unit 91 shows "0", and the bundling-side number of currently-stacked-banknotes display unit 92 shows "60" (Status 10). Thus, when the transactions end normally, the status transitions occur sequentially per transaction.

Figure 5:
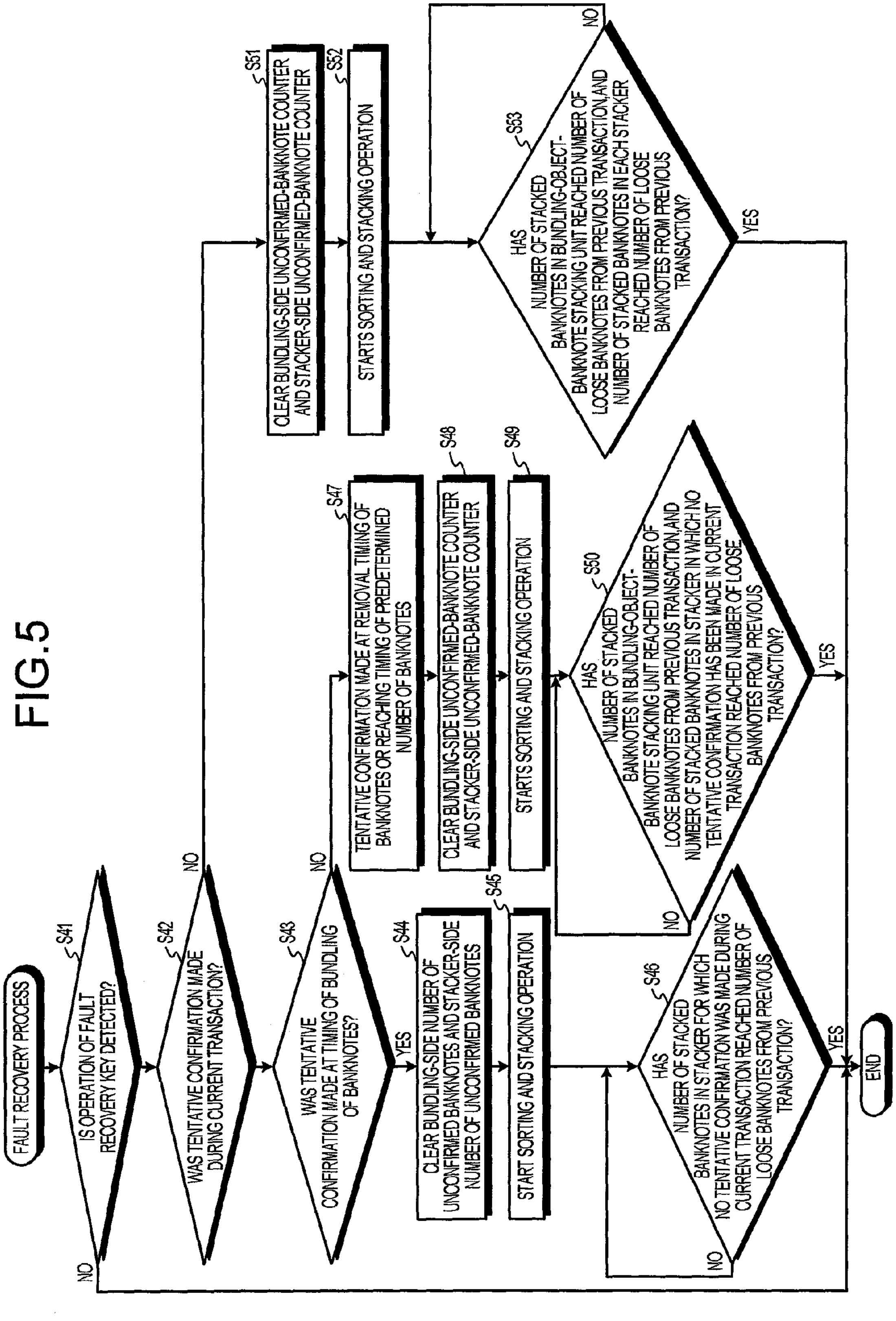
FIG. 5 is a flowchart of a processing operation of the control unit relating to a fault recovery process of the banknote deposit transaction apparatus.

FIG. 5 is a flowchart of a processing operation of the control unit 100 relating to the fault recovery process of the banknote deposit transaction apparatus 1.

The fault recovery process shown in FIG. 5 is a process by which, when a fault, such as jamming, occurs in the banknote deposit transaction apparatus 1 and the fault is cleared, the banknote stacking status is restored to one that was at the time of the last tentative confirmation made in the current transaction or to one that was at the start of the current transaction. This arrangement eliminates the need to unbundle the banknotes that have been bundled during the current transaction.

When a fault such as jamming occurs in the banknote deposit transaction apparatus 1 and the fault is cleared, the operator collects all the banknotes, excluding the bundled banknotes within the banknote deposit transaction apparatus 1, and redeposits the collected banknotes in the hopper unit 11.

After redepositing the collected banknotes in the hopper unit 11, the operator operates the Fault Recovery key 53. The control unit 100 shown in FIG. 2 judges whether the operation of the Fault Recovery key 53 is detected (Step S41).

Upon detection of the operation of the Fault Recovery key 53 (Yes at Step S41), the fault-recovery processing unit 104 within the control unit 100 judges whether the tentative-confirmation judging unit 103 has judged that a tentative confirmation has been made in the current transaction (Step S42).

If a tentative confirmation was made in the current transaction (Yes at Step S42), the fault-recovery processing unit 104 judges whether the tentative confirmation has been made at the timing of bundling of the banknotes (Step S43).

If the tentative confirmation was made at the timing of bundling of the banknotes (Yes at Step S43), the fault-recovery processing unit 104 clears the bundling-side number of unconfirmed banknotes of the bundling-side unconfirmed-banknote counter 71 and the stacker-side number of unconfirmed banknotes of the stacker-side unconfirmed-banknote counter 61 (Step S44), and starts the sorting and stacking operation of the collected banknotes deposited in the hopper unit 11 (Step S45).

As a result, in response to the start of the sorting and stacking operation of the collected banknotes, the control unit 100 sequentially recognizes the collected banknotes, and based on the denomination of the banknote, transports them to the bundling-object-banknote stacking unit 21, the stacker 16, or the rejecting unit 17.

Subsequently, the fault-recovery processing unit 104 judges whether the number of stacked banknotes in the stacker 16, for which no tentative confirmation has been made during the current transaction, has reached the number of loose banknotes from the previous transaction (Step S46).

If the number of stacked banknotes in the stacker 16, for which no tentative confirmation has been made during the current transaction, has reached the previous fraction number (Yes at Step S46), the fault recovery processing unit 104 ends the processing operation shown in FIG. 5.

Meanwhile, if the number of stacked banknotes in the stacker 16, for which no tentative conformation was made during the current transaction, has not reached the number of loose banknotes from the previous transaction (No at Step S46), the fault-recovery processing unit 104 continues to monitor Step S46 until the number of stacked banknotes reaches the sum.

As a result, the banknote stacking statuses of the bundling-object-banknote stacking unit 21 and each of the stackers 16 are returned to ones that were at the time of the tentative confirmation of the previous transaction, the tentative confirmation having been made at the timing of bundling of the banknotes.

If the tentative confirmation was not made at the timing of bundling of the banknotes (No at Step S43), the fault-recovery processing unit 104 judges that the tentative confirmation has been made at the removal timing of the predetermined number of banknotes or the reaching timing of the predetermined number of banknotes (Step S47), clears the bundling-side number of unconfirmed banknotes of the bundling-side unconfirmed-banknote counter 71 and the stacker-side number of unconfirmed banknotes of the stacker-side unconfirmed-banknote counter 61 (Step S48), and starts the sorting and stacking operation of the collected banknotes deposited in the hopper unit 11 (Step S49).

The fault-recovery processing unit 104 judges whether the number of stacked banknotes in the bundling-object-banknote stacking unit 21 has reached the number of loose banknotes from the previous transaction, and whether the number of stacked banknotes in the stacker 16, for which no tentative confirmation has been made in the current transaction, has reached the number of loose banknotes from the previous transaction (Step S50).

If the number of stacked banknotes in the bundling-object-banknote stacking unit 21 has reached the number of loose banknotes from the previous transaction, and the number of stacked banknotes in the stacker 16, for which no tentative confirmation has been made in the current transaction, has reached the number of loose banknotes from the previous transaction (Yes at Step S50), the fault-recovery processing unit 104 ends the processing operation shown in FIG. 5. As a result, the banknote stacking statuses of the bundling-object-banknote stacking unit 21 and each of the stackers 16 are returned to ones that were at the time of the tentative confirmation of the previous transaction, the tentative confirmation having been made at the removal timing of the predetermined number of banknotes or the reaching timing of the predetermined number of banknotes.

If the number of stacked banknotes in the bundling-object-banknote stacking unit 21 has not reached the number of loose banknotes from the previous transaction, or if the number of stacked banknotes in the stacker 16, for which no tentative confirmation has been made in the current transaction, has not reached the number of loose banknotes from the previous transaction (No at Step S50), the fault-recovery processing unit 104 continues to monitor Step S50 until the number of stacked banknotes reaches the specified value.

If no tentative confirmation was made in the current transaction (No at Step S42), the fault-recovery processing unit 104 clears the bundling-side number of unconfirmed banknotes of the bundling-side unconfirmed-banknote counter 71 and the stacker-side number of unconfirmed banknotes of the stacker-side unconfirmed-banknote counter 61 (Step S51), and starts the sorting and stacking operation of the collected banknotes deposited in the hopper unit 11 (Step S52).

The fault-recovery processing unit 104 judges whether the number of stacked banknotes in the bundling-object-banknote stacking unit 21 has reached the number of loose banknotes from the previous transaction, and whether the number of stacked banknotes in each of the stackers 16, for which no tentative confirmation has been made in the current transaction, has reached the number of loose banknotes from the previous transaction (Step S53).

If the number of stacked banknotes in the bundling-object-banknote stacking unit 21 has reached the number of loose banknotes from the previous transaction, and the number of stacked banknotes in each of the stackers 16, for which no tentative confirmation has been made in the current transaction, has reached the number of loose banknotes from the previous transaction (Yes at Step S53), the fault-recovery processing unit 104 ends the processing operation shown in FIG. 5. As a result, the banknote stacking statuses of the bundling-object-banknote stacking unit 21 and each of the stackers 16 are returned to ones that were at the start of the current transaction.

If the number of stacked banknotes in the bundling-object-banknote stacking unit 21 has not reached the number of loose banknotes from the previous transaction, or if the number of stacked banknotes in each of the stackers 16, for which no tentative confirmation has been made in the current transaction, has not reached the number of loose banknotes from the previous transaction (No at Step S53), the fault-recovery processing unit 104 continues to monitor Step S53 until the number of stacked banknotes reaches the specified value.

When no operation of the Fault Recovery key 53 is detected at Step S41 (No at Step S41), the control unit 100 ends the processing operation shown in FIG. 5.

In the fault recovery process shown in FIG. 5, when a fault occurs, the fault is cleared, and the last tentative confirmation in the current transaction was made at the timing of bundling of the banknotes, the sorting and stacking operation of the collected banknotes deposited in the hopper unit 11 is started. When the number of stacked banknotes in the stacker 16, for which no tentative confirmation has been made, reaches the number of loose banknotes from the previous transaction recorded in the stacker-side previous-transaction loose-banknote counter 65, even if there are bundled banknotes during the current transaction, the banknote stacking status can be restored to one that was at the time of the last tentative confirmation made in the current transaction merely by depositing in the hopper unit 11 all the banknotes except the bundled banknotes inside the apparatus, and without having to unbundle the bundled banknotes.

In the fault recovery process, when a fault occurs, the fault is cleared, and the current transaction includes the last tentative confirmation in the current transaction was made at the removal timing of the predetermined number of banknotes or at the reaching timing of the predetermined number of banknotes, the sorting and stacking operation of the collected banknotes deposited in the hopper unit 11 is started. When the number of stacked banknotes in the bundling-object-banknote stacking unit 21 reaches the number of loose banknotes from the previous transaction and the number of stacked banknotes in the stacker 16, for which no tentative confirmation has been made, reaches the number of loose banknotes from the previous transaction, even if there are bundled banknotes during the current transaction, the banknote stacking status in the current transaction can be restored to one that was at the time of the last tentative confirmation made in the current transaction merely by depositing in the hopper unit 11 all the banknotes except the bundled banknotes and the banknotes removed from the stackers 16 inside the apparatus without having to unbundle the bundled banknotes.

In the fault recovery process, when a fault occurs, the fault is cleared, and the current transaction does not include a tentative confirmation, the sorting and stacking operation of the collected banknotes deposited in the hopper unit 11 is started. When the number of stacked banknotes in the bundling-object-banknote stacking unit 21 reaches the number of loose banknotes from the previous transaction and the number of stacked banknotes in each of the stackers 16, for which no tentative confirmation has been made, reaches the number of loose banknotes from the previous transaction, the banknote stacking status can be restored to one that was at the start of the current transaction merely by depositing all the banknotes inside the apparatus in the hopper unit 11.

Figure 6:
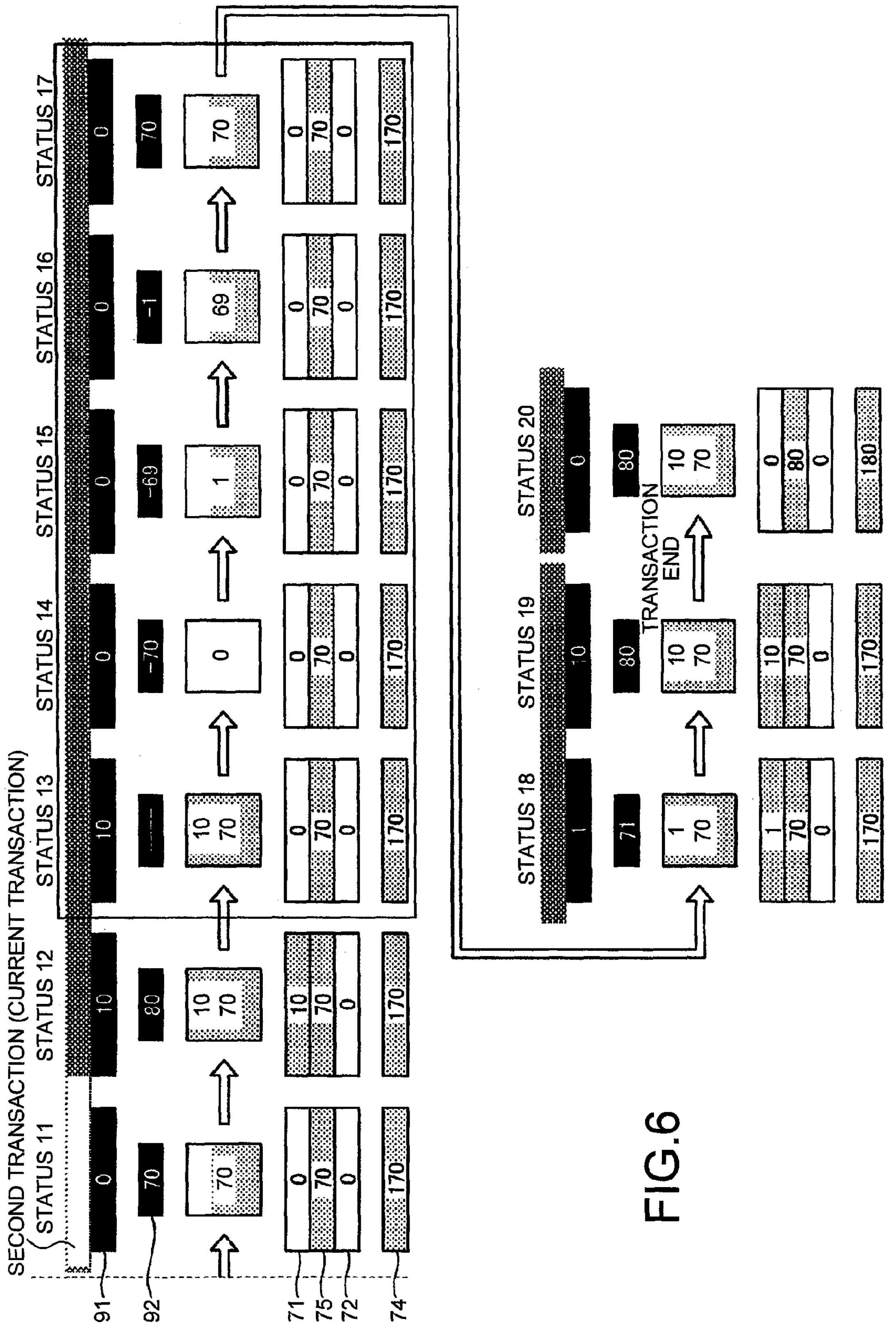
FIG. 6 is a drawing for clearly explaining status transitions of the bundling-object-banknote stacking unit, the bundling-side counter unit, and the bundling-side display unit during the fault recovery process.

FIG. 6 is a drawing for clearly explaining status transitions of the bundling-object-banknote stacking unit 21, the bundling-side counter unit 70, and the bundling-side display unit 90 during fault recovery.

In the example shown in FIG. 6, at the start of the next transaction, it is assumed that the number of stacked banknotes in the bundling-object-banknote stacking unit 21 is "70"; therefore, the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "0", and the bundling-side number of currently-stacked-banknotes display unit 92 all show "70" (Status 11).

Now, assume that ten banknotes of the specific denomination have been stacked anew in the bundling-object-banknote stacking unit 21. In this event, the number of stacked banknotes in the bundling-object-banknote stacking unit 21 becomes "80"; therefore, the bundling-side unconfirmed-banknote counter 71 shows "10", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "10", and the bundling-side number of currently-stacked-banknotes display unit 92 shows "80" (Status 12).

If a fault occurs at Status 12, the number of stacked banknotes in the bundling-object-banknote stacking unit 21 becomes "80"; the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "10", and the bundling-side number of currently-stacked-banknotes display unit 92 shows "–" (Status 13). In this status, fault clearing and collecting of the banknotes are pending.

After fault clearing and collecting of the banknotes, when the operation for fault recovery is detected after the collected banknotes are redeposited in the hopper unit 11, the number of stacked banknotes in the bundling-object-banknote stacking unit 21 is "0"; therefore, the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "0", and the bundling-side in-transaction number of number of currently-stacked-banknotes display unit 92 shows "–70" (Status 14). The sorting and stacking operation of the collected banknotes deposited in the hopper unit 11 is started.

With the start of the sorting and stacking of the collected banknotes, when the number of stacked banknotes in the bundling-object-banknote stacking unit 21 becomes "1", the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "0", and the bundling-side number of currently-stacked-banknotes display unit 92 shows "–69" (Status 15). The sorting and stacking operation of the collected banknotes is sequentially continued.

Eventually, when the number of stacked banknotes in the bundling-object-banknote stacking unit 21 becomes "69", the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "0", and the bundling-side number of currently-stacked-banknotes display unit 92 shows "–1" (Status 16).

When the number of stacked banknotes in the bundling-object-banknote stacking unit 21 becomes "70", the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "0", and the bundling-side number of currently-stacked-banknotes display unit 92 shows "70" (Status 17). The banknote stacking status returns to one that was immediately after completion of the previous transaction.

When the number of stacked banknotes in the bundling-object-banknote stacking unit 21 becomes "71", the bundling-side unconfirmed-banknote counter 71 shows "1", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "1", and the bundling-side number of currently-stacked-banknotes display unit 92 shows "71" (Status 18).

When the number of stacked banknotes in the bundling-object-banknote stacking unit 21 becomes "80", the bundling-side unconfirmed-banknote counter 71 shows "10", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "10", and the bundling-side number of currently-stacked-banknotes display unit 92 shows "80" (Status 19).

When the operation for ending the transaction is detected, the number of stacked banknotes in the bundling-object-banknote stacking unit 21 is "80"; therefore, the bundling-side unconfirmed-banknote counter 71 shows "0", the bundling-side tentatively-confirmed-banknote counter 72 shows "0", the bundling-side cumulative-total counter 74 shows "180", the bundling-side previous-transaction loose-banknote counter 75 shows "80", the bundling-side in-transaction number of banknotes display unit 91 shows "0", and the bundling-side number of currently-stacked-banknotes display unit 92 shows "80" (Status 20).

Figure 7:
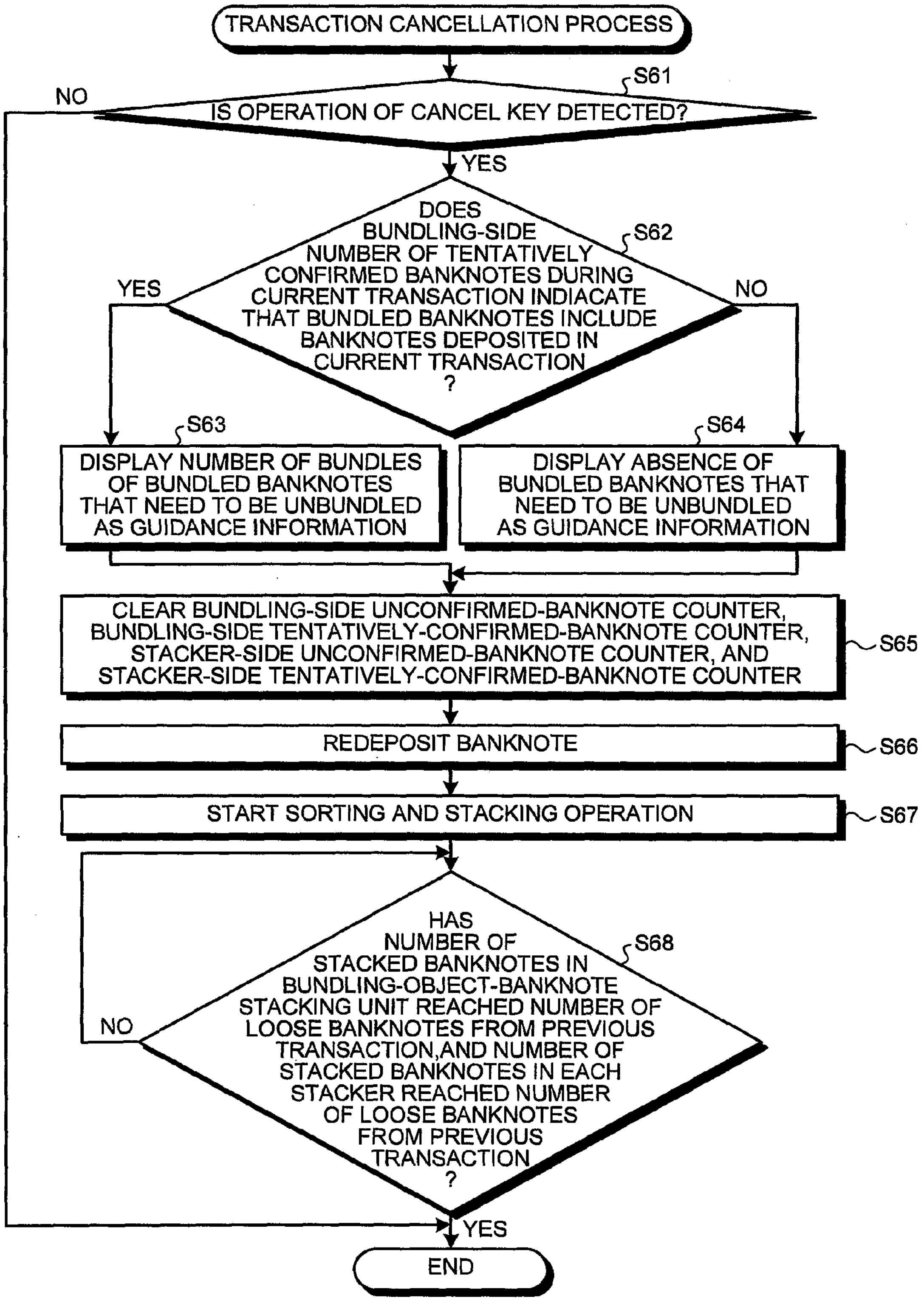
FIG. 7 is a flowchart of a processing operation of the control unit relating to a transaction cancellation process of the banknote deposit transaction apparatus.

FIG. 7 is a flowchart of a processing operation of the control unit 100 relating to the transaction cancellation process of the banknote deposit transaction apparatus 1.

The transaction cancellation process shown in FIG. 7 is a process for canceling the current transaction, and returning all the banknotes deposited in the current transaction.

The control unit 100 judges whether the operation for cancellation of the transaction through the Cancel key 52 has been detected (Step S61).

If the operation for cancellation of the transaction through the Cancel key 52 has been detected (Yes at Step S61), the transaction-cancellation processing unit 105 within the control unit 100 judges, from the bundling-side number of tentatively confirmed banknotes in the bundling-side tentatively-confirmed-banknote counter 72 during the current transaction, whether the banknote bundles include banknotes deposited in the current transaction (Step S62).

If the bundled banknotes include banknotes deposited in the current transaction (Yes at Step S62), the transaction-cancellation processing unit 105, based on the bundling-side number of tentatively confirmed banknotes, displays the number of bundles bundled in the current transaction that need to be unbundled on the information display unit 83 as the guidance information (Step S63). The operator collects the number of bundles displayed on the information display unit 83 from the bundled-banknotes stacking unit 25, and unbundles the collected bundles of banknotes.

If the banknote bundles do not include banknotes deposited in the current transaction (No at Step S62), the transaction-cancellation processing unit 105 displays a message indicating the absence of bundles bundled in the current transaction that need to be unbundled as the guidance information on the information display unit 83 (Step S64).

After displaying the guidance information on the information display unit 83 at Step S63 or Step S64, the transaction-cancellation processing unit 105 clears the bundling-side number of unconfirmed banknotes of the bundling-side unconfirmed-banknote counter 71, the bundling-side number of tentatively-confirmed banknotes of the bundling-side tentatively-confirmed-banknote counter 72, the stacker-side number of unconfirmed banknotes of the stacker-side unconfirmed-banknote counter 61, and the stacker-side number of tentatively-confirmed banknotes of the stacker-side tentatively-confirmed-banknote counter 62 (Step S65).

The operator collects all the unbundled banknotes based on the guidance information at Step S63, all the unconfirmed banknotes stacked in the bundling-object-banknote stacking unit 21, and all the banknotes stacked in each of the stackers 16, and redeposits the collected banknotes in the hopper unit 11.

Upon detection of the redeposited banknotes in the hopper unit 11 (Step S66), the transaction-cancellation processing unit 105 starts the sorting and stacking operation of the collected banknotes redeposited in the hopper unit 11 (Step S67).

The transaction-cancellation processing unit 105 judges whether the number of stacked banknotes in the bundling-object-banknote stacking unit 21 has reached the number of loose banknotes from the previous transaction recorded in the bundling-side previous-transaction loose-banknote counter 75, and whether the number of stacked banknotes in each of the stackers 16 has reached the number of loose banknotes from the previous transaction (Step S68).

If the number of stacked banknotes in the bundling-object-banknote stacking unit 21 has reached the number of loose banknotes from the previous transaction recorded in the bundling-side previous-transaction loose-banknote counter 75, and the number of stacked banknotes in each of the stackers 16 has reached the number of loose banknotes from the previous transaction (Yes at Step S68), the transaction-cancellation processing unit 105 ends the processing operation shown in FIG. 7. As a result, the banknote stacking statuses of the bundling-object-banknote stacking unit 21 and each of the stackers 16 are returned to ones that were immediately before the start of the current transaction.

If the number of stacked banknotes in the bundling-object-banknote stacking unit 21 has not reached the number of loose banknotes from the previous transaction recorded in the bundling-side previous-transaction loose-banknote counter 75, or the number of stacked banknotes in each of the stackers 16 has not reached the number of loose banknotes from the previous transaction (No at Step S68), the transaction-cancellation processing unit 105 continues to monitor Step S68 until the number of stacked banknotes reaches the specific value.

The transaction-cancellation processing unit 105 sequentially sorts and stacks all the collected banknotes until the number of stacked banknotes in the bundling-object-banknote stacking unit 21 reaches the number of loose banknotes from the previous transaction recorded in the bundling-side previous-transaction loose-banknote counter 75, and the number of stacked banknotes in each of the stackers 16 reaches the number of loose banknotes from the previous transaction. However, upon detection of a banknote of the specific denomination classified as belonging to the bundling-object-banknote stacking unit 21 in which the number of stacked banknotes has already reached the bundling-side number of unconfirmed banknotes or to the stacker 16 in which the number of stacked banknotes has already reached the stacker-side number of cumulative-total banknotes, instead of sorting and stacking it in the bundling-object-banknote stacking unit 21 or the stacker 16, the transaction-cancellation processing unit 105 sends the banknote to the rejecting unit 17.

As a result, the banknote stacking statuses of the bundling-object-banknote stacking unit 21 and each of the stackers 16 are returned to ones that were immediately before the start of the current transaction, and the banknotes deposited after the start of the current transaction can be collected from the rejecting unit 17.

In the transaction cancellation process shown in FIG. 7, upon detection of the operation for canceling a transaction, if, based on the bundling-side number of tentatively-confirmed banknotes of the bundling-side tentatively-confirmed-banknote counter 72 during the current transaction, it is decided that the bundled banknotes include the banknotes deposited in the current transaction, the number of banknote bundles bundled in the current transaction that need to be unbundled is displayed on the information display unit 83 as the guidance information. Consequently, the operator collects the number of bundles displayed on the information display unit 83 from the bundled-banknotes stacking unit 25, and unbundles only that many bundles of banknotes.

In the transaction cancellation process, the collected banknotes are deposited in the hopper unit 11, the sorting and stacking operation of the collected banknotes is started, and all the collected banknotes are sequentially sorted and stacked until the number of stacked banknotes in the bundling-object-banknote stacking unit 21 reaches the number of loose banknotes from the previous transaction, and the number of stacked banknotes in each of the stackers 16 reaches the number of loose banknotes from the previous transaction. Furthermore, upon detection of a banknote of the specific denomination classified as belonging to the bundling-object-banknote stacking unit 21 in which the number of stacked banknotes has already reached the bundling-side number of loose banknotes or to the stacker 16 in which the number of stacked banknotes has already reached the stacker-side number of loose banknotes, the banknote is sent to the rejecting unit 17 instead of being sorted and stacked in the bundling-object-banknote stacking unit 21 or the stacker 16. As a result, the banknote stacking statuses of the bundling-object-banknote stacking unit 21 and each of the stackers 16 are returned to ones that were immediately before the start of the current transaction, and the banknotes deposited after the start of the current transaction can be collected from the rejecting unit 17.

Figure 8:
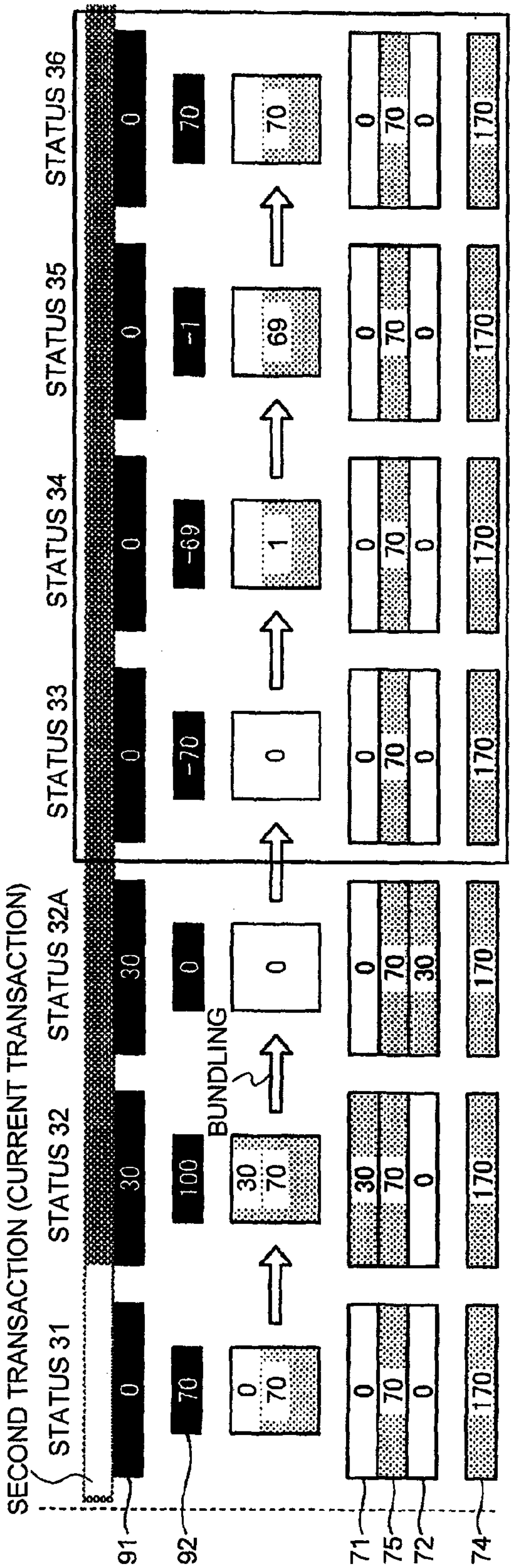
FIG. 8 is a drawing for clearly explaining status transitions of the bundling-object-banknote stacking unit, the bundling-side counter unit, and the bundling-side display unit during a transaction cancellation process.

FIG. 8 is a drawing for clearly explaining status transitions of the bundling-object-banknote stacking unit 21, the bundling-side counter unit 70, and the bundling-side display unit 90 during cancellation of a transaction.

In FIG. 8, at the start of the next transaction, the number of stacked banknotes in the bundling-object-banknote stacking unit 21 is "70"; therefore, the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "0", and the bundling-side number of currently-stacked-banknotes display unit 92 all show "70" (Status 31).

Next, when 30 banknotes of the specific denomination have been stacked in the bundling-object-banknote stacking unit 21, the number of stacked banknotes in the bundling-object-banknote stacking unit 21 becomes "100"; therefore, the bundling-side unconfirmed-banknote counter 71 shows "30", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "30", and the bundling-side number of currently-stacked-banknotes display unit 92 shows "100" (Status 32).

When the 100 banknotes of the specific denomination stacked in the bundling-object-banknote stacking unit 21 are transported to the banknote bundling unit 22 for bundling, the number of stacked banknotes in the bundling-object-banknote stacking unit 21 becomes "0"; therefore, the bundling-side unconfirmed-banknote counter 71 shows "0", the bundling-side tentatively-confirmed-banknote counter 72 shows "30", the bundling-side previous-transaction loose-banknote counter 75 shows "70", the bundling-side cumulative-total counter 74 shows "170", the bundling-side in-transaction number of banknotes display unit 91 shows "30", and the bundling-side number of currently-stacked-banknotes display unit 92 shows "0" (Status 32A).

If the transaction cancellation process is performed at Status 32A, the number of stacked banknotes in the bundling-object-banknote stacking unit 21 is "0", the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "0", and the bundling-side number of currently-stacked-banknotes display unit 92 shows "−70" (Status 33). Based on the displayed guidance information, the operator collects all the banknotes stacked in the bundling-object-banknote stacking unit 21, deposits the collected banknotes in the hopper unit 11, and starts the sorting and stacking operation of the collected banknotes.

With the start of the sorting and stacking of the collected banknotes, when the number of stacked banknotes in the bundling-object-banknote stacking unit 21 becomes "1", the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "0", and the bundling-side number of currently-stacked-banknotes display unit 92 shows "−69" (Status 34). The sorting and stacking operation of the collected banknotes is sequentially continued.

Eventually, when the number of stacked banknotes in the bundling-object-banknote stacking unit 21 becomes "69", the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "0", and the bundling-side number of currently-stacked-banknotes display unit 92 shows "−1" (Status 35).

When the number of stacked banknotes in the bundling-object-banknote stacking unit 21 becomes "70", the bundling-side unconfirmed-banknote counter 71 shows "0", the bundling-side tentatively-confirmed-banknote counter 72 shows "0", the bundling-side cumulative-total counter 74 shows "170", the bundling-side previous-transaction loose-banknote counter 75 shows "70", the bundling-side in-transaction number of banknotes display unit 91 shows "0", and the bundling-side number of currently-stacked-banknotes display unit 92 shows "70" (Status 36). The banknote stacking status returns to one that was immediately after completion of the previous transaction.

In the present embodiment, the number of bundling-object-banknotes are counted as the number of unconfirmed banknotes, and at the timing of bundling of 100 banknotes, the number of unconfirmed banknotes among the bundling-object-banknotes in the current transaction are tentatively confirmed. Consequently, even if the banknote bundling function for bundling 100 banknotes is added, a better separation of transactions is enabled in the bundled banknotes. In addition, for example, in a fault recovery during the current transaction, instead of redepositing all the banknotes in the current transaction as well as the previous transaction, only the number of unconfirmed banknotes needs to be redeposited in the hopper unit 11. Also, if there are banknotes that have already been bundled in the current transaction, there is no need for unbundling the bundled banknotes. Consequently, associated work burden can be largely reduced.

In the present embodiment, when the operation for ending the transaction is detected, the total number of tentatively confirmed banknotes and the number of unconfirmed banknotes deposited in the current transaction are confirmed as the total number of banknotes deposited in the current transaction. Furthermore, the number of stacked banknotes in the bundling-object-banknote stacking unit 21 is recorded and managed as the number of loose banknotes from the previous transaction. Consequently, even if the banknote bundling function for bundling the predetermined number of banknotes is added, in response to the operation for ending the transaction, not only can a separation of the banknotes in a banknote bundle into banknotes deposited in the current transaction and the previous transactions be made, but also the number of all the deposited banknotes in the current transaction can be confirmed.

In the present embodiment, when removal of the banknotes sorted and stacked in the stacker 16 is detected, the number of unconfirmed banknotes in the stacker 16 and the number of unconfirmed banknotes in the bundling-object-banknote stacking unit 21 in the current transaction are tentatively confirmed at the removal timing of the predetermined number of banknotes or the reaching timing of the predetermined number of banknotes. Consequently, even when operated with the stacker 16, a better separation of transactions is enabled in the bundled banknotes. In addition, for example, in a fault recovery during the current transaction, instead of all the banknotes in the current transaction as well as the previous transaction, only the number of unconfirmed banknotes in the bundling-object-banknote stacking unit 21 needs to be redeposited in the hopper unit 11, in addition to all the banknotes stacked in the stacker 16. Consequently, associated work burden can be largely reduced.

In the present embodiment, when the operation for ending the transaction is detected, the number of tentatively confirmed banknotes and the number of unconfirmed banknotes in the bundling-object-banknote stacking unit 21 in the current transaction are confirmed as the total number of banknotes in the bundling-object-banknote stacking unit 21 in the current transaction. Furthermore, the total number of tentatively confirmed banknotes and the number of unconfirmed banknotes in the stacker 16 in the current transaction are confirmed as the total number of banknotes in the stacker 16 in the current transaction. In addition, the number of stacked banknotes in the bundling-object-banknote stacking unit 21 is recorded and managed as the number of loose banknotes of the bundling-object-banknote stacking unit 21 from the previous transaction. Consequently, even when operated with the stacker 16, in response to the operation for ending the transaction, not only can a separation of the banknotes in a banknote bundle into banknotes deposited in the current transaction and the previous transactions be made, but also the number of all the deposited banknotes in the current transaction can be confirmed.

In the present embodiment, when a fault recovery operation is detected in the current transaction, and when the current transaction includes a tentative confirmation, the number of unconfirmed banknotes in the bundling-object-banknote stacking unit 21 and the stacker 16 in the current transaction is cleared, all the banknotes inside the apparatus except the bundled banknotes are redeposited in the hopper unit 11, and the banknotes redeposited in the hopper unit 11 are retransported. Consequently, even when operated with the stacker 16, and even when there are bundled banknotes during the current transaction, the banknote stacking status in the current transaction can be restored to one that was at the time of the immediate previous tentative confirmation made in the current transaction merely by redepositing in the hopper unit 11 all the banknotes except the bundled banknotes, and without having to unbundle the bundled banknotes.

In the present embodiment, when a fault recovery operation is detected in the current transaction, and the current transaction does not include a tentative confirmation, the number of unconfirmed banknotes in the bundling-object-banknote stacking unit 21 and the stacker 16 in the current transaction is cleared, the banknotes inside the apparatus are redeposited in the hopper unit 11, and the banknotes redeposited in the hopper unit 11 are retransported to restore in the bundling-object-banknote stacking unit 21 the number of loose banknotes from the previous transaction that is recorded and managed. Consequently, even when operated with the stacker 16, and there are no bundled banknotes in the current transaction, the banknote stacking status in the current transaction can be restored to one that was at the start of the current transaction by merely redepositing in the hopper unit 11 all the banknotes inside the apparatus.

In the present embodiment, when the cancellation operation of the current transaction is detected, the number of tentatively confirmed banknotes and the number of unconfirmed banknotes of the bundling-object-banknote stacking unit 21 and the stacker 16 in the current transaction are cleared. In addition, all the banknotes stacked in the stacker 16 as well as the bundled banknotes including the banknotes of the current transaction and/or the number of unconfirmed banknotes are redeposited in the hopper unit 11, and the banknotes redeposited in the hopper unit 11 are retransported to restore in the bundling-object-banknote stacking unit 21 the number of loose banknotes from the previous transaction that is recorded and managed by the confirming unit 102, while rejecting from the apparatus the tentatively confirmed banknotes and the unconfirmed banknotes that had been stacked in the bundling-object-banknote stacking unit 21 and the stacker 16 in the current transaction. Consequently, even when operated with the stacker 16, all the banknote deposit transactions in the current transaction can be cancelled.

In the present embodiment, when the cancellation operation of the current transaction is detected, the number of all the bundled banknotes in the current transaction is displayed as a guidance information. As a result, by looking at the displayed guidance information, the operator recognizes all the bundled banknotes that need to be unbundled for the cancellation operation.

In the present embodiment, the control unit 100 is provided inside the banknote deposit transaction apparatus 1. However, the control unit 100 can be provided inside the banknote processing device 2 or the banknote bundling device 3 within the banknote deposit transaction apparatus 1.

In the present embodiment, the number of unconfirmed banknotes in the current transaction present in the banknotes to be bundled is tentatively confirmed at the timing of bundling of the predetermined number of banknotes by the banknote bundling unit 22. However, number of unconfirmed banknotes in the current transaction can be tentatively confirmed at the timing when the number of stacked banknotes in the bundling-object-banknote stacking unit 21 reaches a predetermined value.

In the present embodiment, the number of unconfirmed banknotes in the current transaction can be tentatively confirmed at a timing of clamping of the banknote bundle by the banknote-bundle removing unit from the bundling-object-banknote stacking unit 21.

In the present embodiment, upon detection of an operation for ending a transaction, by a predetermined setting, the confirming unit 102 can remove the banknotes stacked in the bundling-object-banknote stacking unit 21, and record the number of loose banknotes from the previous transaction as zero. In such a case, according to the predetermined setting, the number of loose banknotes per transaction can be removed.

Although the invention has been described with respect to a specific embodiment for a complete and clear disclosure, the accompanying claims are not to be thus limited but are to be construed as embodying all modifications and alternative constructions that may occur to one skilled in the art which fairly fall within the basic teaching herein set forth. The advantages of the present embodiment are not limited to those stated here.

All the automatic processes explained in the present embodiment can be, entirely or in part, carried out manually by a known method. Similarly, all the manual processes explained in the present embodiment can be; entirely or in part, carried out automatically by a known method. The process procedures, the control procedures, specific names, and data, including various parameters, mentioned in the description and drawings can be changed as required unless otherwise specified.

The constituent elements of the apparatus illustrated are merely conceptual and may not necessarily physically resemble the structures shown in the drawings. For instance, the apparatus need not necessarily have the structure that is illustrated. It is needless to say that the concrete structure of the apparatus should not be limited to the one shown in the drawings.

Each processing function performed by the apparatus can be entirely or partially performed by a CPU (Central Processing Unit) (or a microcomputer such as an MPU (Micro Processing Unit), and an MCU (Micro Controller Unit)), or a program executed by the CPU (or the microcomputer such as the MPU, and the MCU), or a hardware using wired logic.

The invention claimed is:

1. A banknote deposit transaction apparatus that confirms a number of deposited banknotes in continuous deposit transactions on a per transaction basis, the banknote deposit transaction apparatus comprising:

an inlet port for depositing a plurality of banknotes;

a transporting unit that feeds and transports, one by one, the banknotes deposited into the inlet port;

a bundling-object-banknote stacking unit that sequentially sorts and stacks banknotes of a specific denomination that are bundling-object-banknotes among the banknotes that are sequentially transported by the transporting unit;

a bundling-object-banknote counting unit that counts a number of the bundling-object-banknotes that are sorted and stacked in the bundling-object-banknote stacking unit as a number of unconfirmed deposited banknotes;

a banknote bundling unit that, when the number of bundling-object-banknotes that are sorted and stacked in the bundling-object-banknote stacking unit reaches a predetermined number, bundles the predetermined number of the bundling-object-banknotes;

a tentative confirming unit that performs a tentative confirmation of the number of unconfirmed deposited banknotes in a current transaction among the banknotes that are to be bundled, at a timing of bundling of the predetermined number of bundling-object-banknotes; and a confirming unit that, upon detecting an operation for ending a transaction, confirms a total of the number of tentatively confirmed deposited banknotes and the number of unconfirmed deposited banknotes in the current transaction as a total number of banknotes deposited in the current transaction, and performs recording and management of the number of stacked banknotes that are stacked in the bundling-object-banknote stacking unit as a number of loose banknotes of a previous transaction.

2. The banknote deposit transaction apparatus according to claim 1, further comprising:

a tentative-confirmation judging unit that, upon detecting an operation for fault recovery during the current transaction, judges whether the tentative confirmation has been made during the current transaction; and a control unit that, when the tentative confirmation has been made during the current transaction, clears the number of unconfirmed deposited banknotes in the current transaction, and after redepositing into the inlet port all the banknotes present inside the apparatus, other than bundled banknotes, controls the transporting unit to retransport the banknotes that are redeposited into the inlet port.

3. The banknote deposit transaction apparatus according to claim 2, wherein the control unit, when the tentative confirmation was not made during the current transaction by the tentative confirming unit, clears the number of unconfirmed deposited banknotes in the current transaction, and after redepositing into the inlet port all the banknotes present inside the apparatus, controls the transporting unit to retransport the banknotes that are redeposited into the inlet port so that the number of banknotes stacked in the bundling-object-banknote stacking unit is equivalent to the number that is being recorded and managed by the confirming unit as the number of loose banknotes from a transaction immediately before the current transaction.

4. The banknote deposit transaction apparatus according to claim 1, further comprising:

a control unit that, upon detecting an operation for cancelling the current transaction, clears the number of tentatively confirmed deposited banknotes and the number of unconfirmed deposited banknotes in the current transaction, and after redepositing into the inlet port banknotes in the current transaction including bundled banknotes or banknotes equivalent to the number of unconfirmed deposited banknotes, controls the transporting unit to retransport the banknotes that are redeposited into the inlet port so that the number of banknotes stacked in the bundling-object-banknote stacking unit is equivalent to the number that is being recorded and managed by the confirming unit as the number of loose banknotes from a transaction immediately before the current transaction while rejecting the tentatively confirmed banknotes and the unconfirmed banknotes in the current transaction from the apparatus.

5. The banknote deposit transaction apparatus according to claim 4, further comprising:

a display unit that, upon detecting the operation for cancelling the current transaction, displays a number of bundles of all the banknotes that have been bundled during the current transaction as guidance information.

6. The banknote deposit transaction apparatus according to claim 1, wherein the timing of bundling represents a timing at which the predetermined number of banknotes is bundled by the banknote bundling unit.

7. The banknote deposit transaction apparatus according to claim 1, wherein the timing of bundling represents a timing at which the number of bundling-object-banknotes that are sorted and stacked in the bundling-object-banknote stacking unit reaches the predetermined number.

8. The banknote deposit transaction apparatus according to claim 1, wherein the confirming unit, upon detecting the operation for ending the transaction, based on a predetermined setting, stimulates removal of the banknotes that are stacked in the bundling-object-banknote stacking unit, and performs recording and management of the number of loose banknotes of the previous transaction as zero.

9. The banknote deposit transaction apparatus according to claim 1, further comprising:

a sorted-banknote stacking unit that sorts and stacks banknotes other than the banknotes of the specific denomination, that are transported by the transporting unit, based on a denomination of the banknotes; and a sorted-banknote counting unit that counts the banknotes that are sorted and stacked in the sorted-banknote stacking unit as unconfirmed banknotes per denomination, wherein the tentative confirming unit, upon detecting removal of a predetermined number of banknotes that are sorted and stacked in the sorted-banknote stacking unit, performs a tentative confirmation of the number of unconfirmed deposited banknotes in the current transaction in the sorted-banknote stacking unit at a removal timing of the banknotes, and the confirming unit, upon detecting the operation for ending the transaction, confirms a total of the number of tentatively confirmed deposited banknotes and unconfirmed deposited banknotes, that are in the bundling-object-banknote stacking unit, in the current transaction as a total number of banknotes deposited in the current transaction of the bundling-object-banknote stacking unit, confirms a total of the number of tentatively confirmed deposited banknotes and unconfirmed deposited banknotes, that are in the sorted-banknote stacking unit, in the current transaction as a total number of banknotes deposited in the current transaction of the sorted-banknote stacking unit, performs recording and management of the number of stacked banknotes that are stacked in the bundling-object-banknote stacking unit as a number of loose banknotes of the previous transaction of the bundling-object-banknote stacking unit, and performs recording and management of the number of stacked banknotes that are stacked in the sorted-banknote stacking unit as a number of loose banknotes of the previous transaction of the sorted-banknote stacking unit.

10. The banknote deposit transaction apparatus according to claim 9, further comprising:

a tentative-confirmation judging unit that, upon detecting an operation for fault recovery during the current transaction, judges whether the tentative confirmation has been made during the current transaction; and a control unit that, when the tentative confirmation has been made during the current transaction, clears the number of unconfirmed deposited banknotes in the bundling-object-banknote stacking unit and the sorted-banknote stacking unit in the current transaction, and after redepositing into the inlet port all the banknotes present inside the apparatus other than bundled banknotes and removed banknotes that are removed from the sorted-banknote stacking unit, controls the transporting unit to retransport the banknotes that are redeposited into the inlet port.

11. The banknote deposit transaction apparatus according to claim 10, wherein the control unit, when the tentative confirmation was not made during the current transaction by the tentative confirming unit, clears the number of unconfirmed deposited banknotes in the bundling-object-banknote stacking unit and the sorted-banknote stacking unit in the current transaction, and after redepositing into the inlet port all the banknotes present inside the apparatus, controls the transporting unit to retransport the banknotes that are redeposited into the inlet port so that the number of banknotes stacked in the bundling-object-banknote stacking unit is equivalent to the number that is being recorded and managed by the confirming unit as the number of loose banknotes of the bundling-object-banknote stacking unit from a transaction immediately before the current transaction, and the number of banknotes stacked in the sorted-banknote stacking unit is equivalent to the number that is being recorded and managed by the confirming unit as the number of loose banknotes of the sorted-banknote stacking unit from the transaction immediately before the current transaction.

12. The banknote deposit transaction apparatus according to claim 9, further comprising:

a control unit that, upon detecting an operation for cancelling the current transaction, clears the number of tentatively confirmed deposited banknotes in the bundling-object-banknote stacking unit and the sorted-banknote stacking unit in the current transaction, and after redepositing into the inlet port banknotes, in addition to all the banknotes that are stacked in the sorted-banknote stacking unit, all the bundled banknotes including the banknotes in the current transaction in the apparatus, the banknotes that have been removed from the sorted-banknote stacking unit, or banknotes equivalent to the number of unconfirmed deposited banknotes, controls the transporting unit to retransport the banknotes that are redeposited into the inlet port so that the number of banknotes stacked in the bundling-object-banknote stacking unit is equivalent to the number that is being recorded and managed by the confirming unit as the number of loose banknotes of the bundling-object-banknote stacking unit from a transaction immediately before the current transaction, and the number of banknotes stacked in the sorted-banknote stacking unit is equivalent to the number that is being recorded and managed by the confirming unit as the number of loose banknotes of the sorted-banknote stacking unit from the transaction immediately before the current transaction while rejecting the tentatively confirmed banknotes and the unconfirmed banknotes, that had been stacked in the bundling-object-banknote stacking unit or the sorted-banknote stacking unit in the current transaction, from the apparatus.

13. The banknote deposit transaction apparatus according to claim 12, further comprising:

a display unit that, upon detecting the operation for cancelling the current transaction, displays a number of bundles of all the banknotes that have been bundled including the banknotes in the current transaction as guidance information.

14. A banknote deposit transaction method comprising:

depositing a plurality of banknotes;

transporting the banknotes that are deposited and are fed one by one;

stacking banknotes of a specific denomination that are sorted as bundling-object-banknotes among the banknotes that are sequentially transported at the transporting;

counting a number of the bundling-object-banknotes that are sorted and stacked at the stacking as number of unconfirmed deposited banknotes;

bundling the predetermined number of the bundling-object-banknotes when the number of bundling-object-banknotes that are sorted and stacked at the stacking reaches a predetermined number;

performing a tentative confirmation of the number of unconfirmed deposited banknotes in a current transaction among the banknotes that are to be bundled at a timing of bundling of the predetermined number of the bundling-object-banknotes; and confirming a total of the number of tentatively confirmed deposited banknotes and the number of unconfirmed deposited banknotes in the current transaction as a total number of banknotes deposited in the current transaction upon detecting an operation for ending a transaction, and performing recording and management of the number of stacked banknotes, that are stacked at the stacking of the bundling-object-banknote, as a number of loose banknotes of a previous transaction.

15. The banknote deposit transaction method according to claim 14, further comprising:

stacking banknotes other than the transported bundling-object-banknotes of the specific denomination and are sorted as sorted-banknotes based on a denomination of the banknotes; and counting the banknotes that are sorted and stacked at the stacking of sorted-banknote as unconfirmed banknotes per denomination, wherein the tentative confirmation, upon detecting removal of a predetermined number of banknotes that are sorted and stacked at the stacking of sorted-banknotes, includes performing a tentative confirmation of the number of unconfirmed deposited banknotes stacked at the stacking of sorted-banknote in the current transaction, at a removal timing of the banknotes, and the confirming, upon detecting the operation for ending the transaction, includes confirming a total of the number of tentatively confirmed deposited banknotes in the current transaction at the stacking of bundling-object-banknotes and the number of unconfirmed deposited banknotes as a total number of banknotes deposited in the current transaction at the stacking of bundling-object-banknotes, confirming a total of the number of tentatively confirmed deposited banknotes in the current transaction at the counting of sorted-banknotes and the number of unconfirmed deposited banknotes as a total number of banknotes deposited in the current transaction at the counting of sorted-banknotes, performing recording and management of the number of stacked banknotes that are stacked at the stacking of bundling-object-banknotes as the number of loose banknotes of the previous transaction at the stacking of bundling-object-banknotes, and performing recording and management of the number of stacked banknotes that are stacked at the stacking of sorted-banknotes as the number of loose banknotes of the previous transaction at the stacking of sorted-banknotes.

* * * * *